United States Patent
He et al.

(10) Patent No.: US 8,874,558 B1
(45) Date of Patent: Oct. 28, 2014

(54) PROMOTING FRESH CONTENT FOR AUTHORITATIVE CHANNELS

(75) Inventors: Jianming He, Cupertino, CA (US); Yuguang Wu, Santa Clara, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/609,804

(22) Filed: Sep. 11, 2012

(51) Int. Cl.
*G06F 17/30* (2006.01)

(52) U.S. Cl.
USPC .......................... 707/723; 707/706; 707/748

(58) Field of Classification Search
None
See application file for complete search history.

(56) References Cited

U.S. PATENT DOCUMENTS

| | | | | |
|---|---|---|---|---|
| 6,601,075 | B1* | 7/2003 | Huang et al. | 707/748 |
| 2005/0234877 | A1* | 10/2005 | Yu | 707/3 |
| 2007/0078838 | A1* | 4/2007 | Chung | 707/3 |
| 2010/0211609 | A1* | 8/2010 | Xiong et al. | 707/803 |
| 2011/0246456 | A1* | 10/2011 | Weitz et al. | 707/724 |
| 2011/0246484 | A1* | 10/2011 | Dumais et al. | 707/749 |
| 2012/0136853 | A1* | 5/2012 | Kennedy et al. | 707/723 |
| 2012/0158747 | A1* | 6/2012 | Satow et al. | 707/748 |

OTHER PUBLICATIONS

Kleinberg, Jon M.; "Authoritative sources in a hyperlinked environment"; Sep. 1999; Journal of the ACM, vol. 46, No. 5; pp. 604-632.*

* cited by examiner

*Primary Examiner* — Tony Mahmoudi
*Assistant Examiner* — Umar Mian
(74) *Attorney, Agent, or Firm* — Harrity & Harrity, LLP

(57) ABSTRACT

A system is configured to identify a particular channel that provides content, where the particular channel includes content items; determine a respective first score, for each of the content items, that reflects a measure of quality of the content item; determine a topic distribution, for each of the content items, that indicates a topic conveyed by the content item; assign a second score, to the particular channel, that reflects a measure of quality of the particular channel; determine a particular term for which the particular channel is authoritative based on the first scores, the topic distributions, and the second score; and store information identifying the particular channel as authoritative for the particular term. A new content item, associated with the particular channel and relating to the particular term, may be promoted in search results for a search query relating to the particular term.

22 Claims, 16 Drawing Sheets

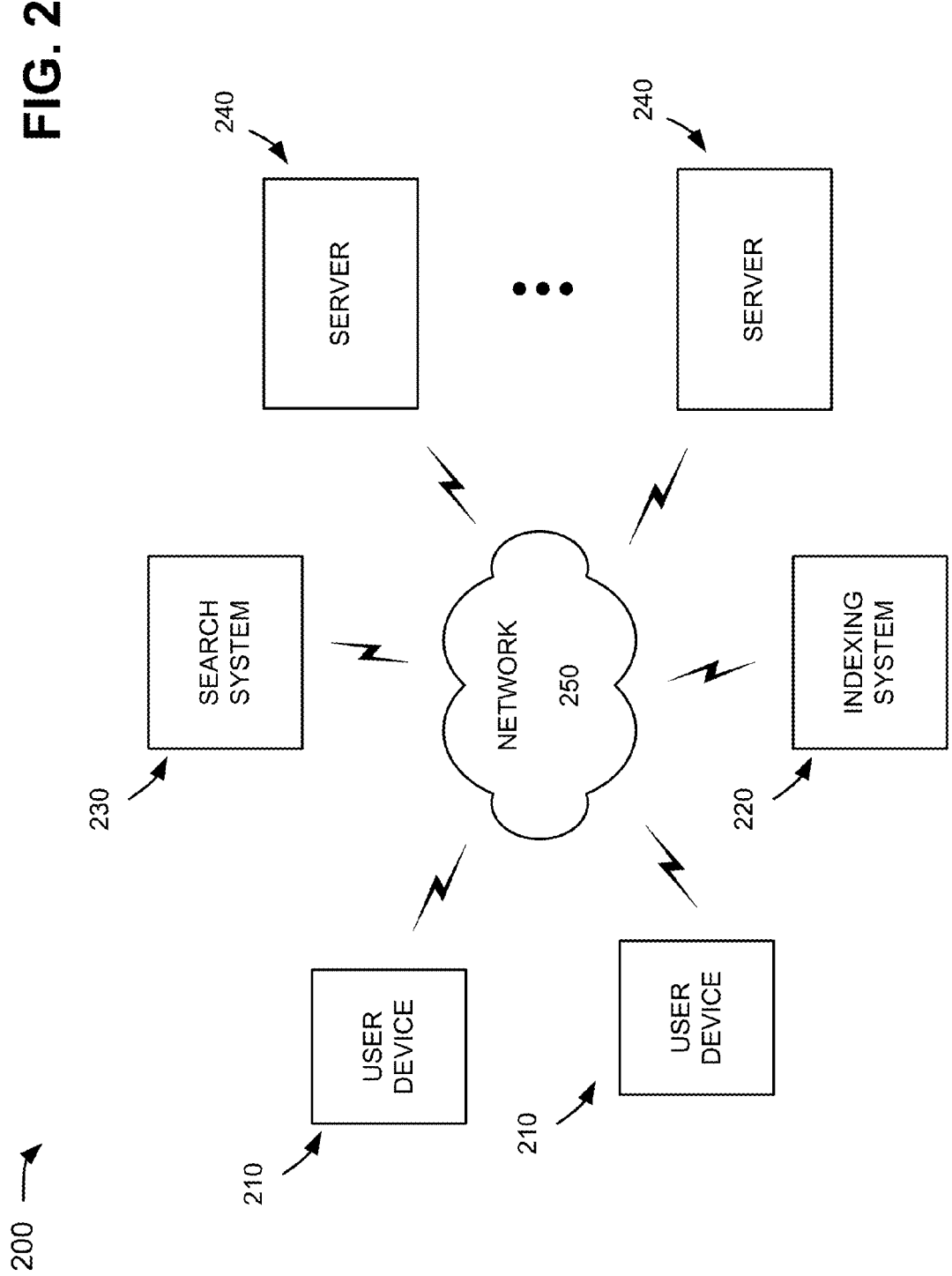

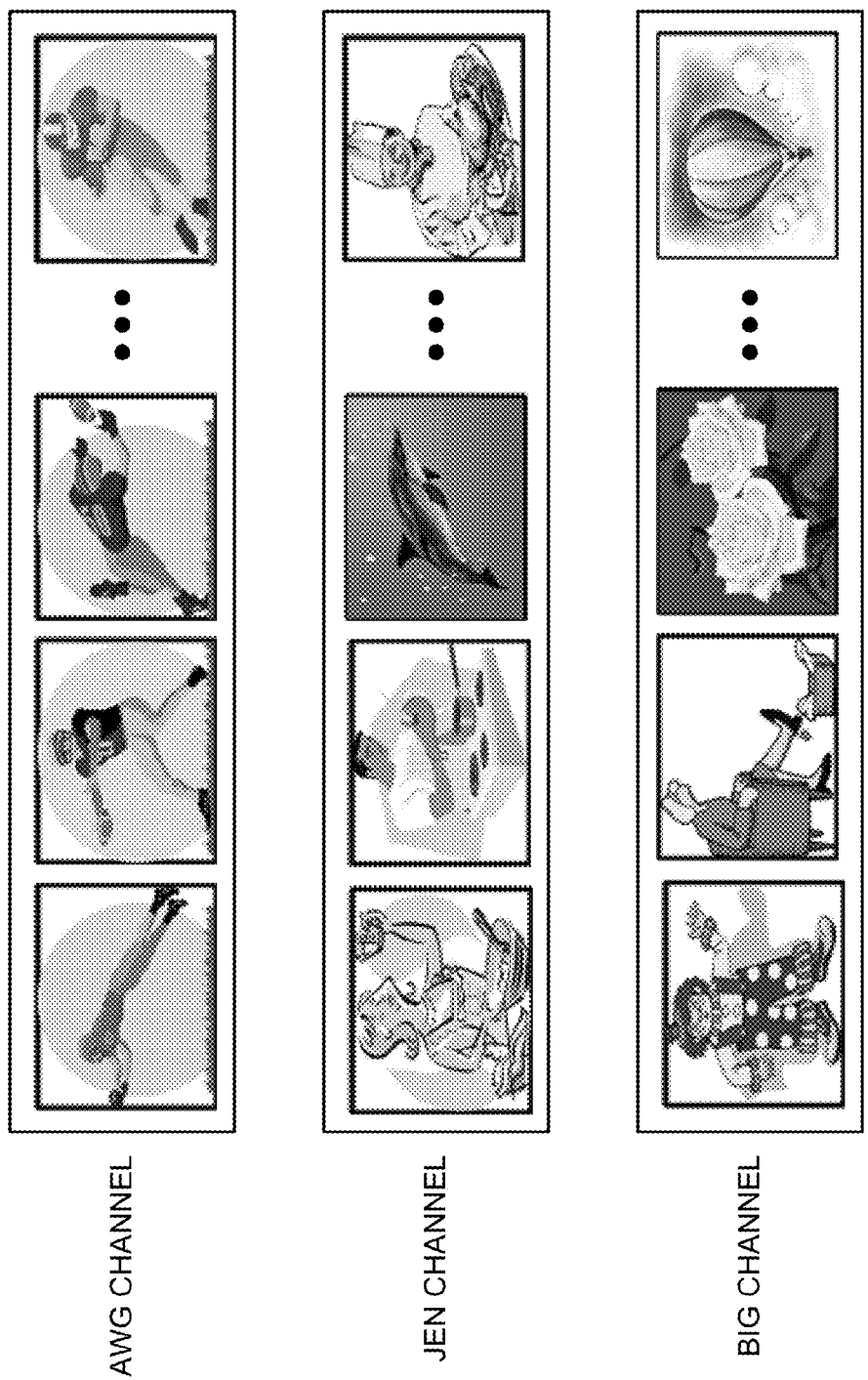

PROMOTING FRESH CONTENT FOR AUTHORITATIVE CHANNELS

BACKGROUND

Many techniques are available to users today to find information on the World Wide Web ("web"). Users can use web browsers and/or search engines to find information of interest. For example, a user may submit a search query to a search engine and the search engine may identify information that is relevant to the search query. The search engine may use quality signals to determine the order in which to present relevant information to the user.

SUMMARY

According to some possible implementations, a method may be performed by one or more computer devices. The method may include identifying, by at least one of the one or more computer devices, a particular channel of a set of channels that provide content, where the particular channel may include a set of content items; determining, by at least one of the one or more computer devices, a respective first score for each of the set of content items, where the first score, for one of the set of content items, may reflect a measure of quality of the one of the set of content items; determining, by at least one of the one or more computer devices, a topic distribution for each of the set of content items, where the topic distribution, for the one of the set of content items, may indicate a topic conveyed by the one of the set of content items; assigning, by at least one of the one or more computer devices, a second score to the particular channel, where the second score may reflect a measure of quality of the particular channel; determining, by at least one of the one or more computer devices, a particular term for which the particular channel is authoritative based on the first scores, the topic distributions, and the second score; and storing, by at least one of the one or more computer devices, information identifying the particular channel as authoritative for the particular term, where a new content item, associated with the particular channel and relating to the particular term, may be promoted in search results for a search query relating to the particular term.

Additionally, or alternatively, the method, when determining the particular term for which the particular channel is authoritative, may include calculating, for each content item, of the set of content items, and relative to the particular term, a third score based on the first score of the content item, and a value of the topic distribution, of the content item, corresponding to the particular term, and using the third scores to determine that the particular channel is authoritative for the particular term.

Additionally, or alternatively, the method, when using the third scores to determine that the particular channel is authoritative for the particular term, may include combining the third scores to calculate a fourth score for the channel, and using the fourth score to determine that the particular channel is authoritative for the particular term.

Additionally, or alternatively, the method, when using the fourth score to determine that the particular channel is authoritative for the particular term, may include normalizing the fourth score, based on a total quantity of the set of content items included in the particular channel, to obtain a normalized fourth score, and using the normalized fourth score to determine that the particular channel is authoritative for the particular term.

Additionally, or alternatively, the method, when using the normalized fourth score to determine that the particular channel is authoritative for the particular term, may include calculating a fifth score, for the particular channel, based on the normalized fourth score and the second score, and using the fifth score to determine that the particular channel is authoritative for the particular term.

Additionally, or alternatively, the method may further include identifying another channel, of the set of channels, that has been identified as authoritative for the particular term; and creating a list of authoritative channels for the particular term, where the list may identify the particular channel and the other channel.

Additionally, or alternatively, the method may further include identifying the particular channel as authoritative for the particular term based on a position of the particular channel in the list.

According to some possible implementations, a system may include one or more computer devices to: identify a particular channel of a set of channels that provide content, where the particular channel may include a set of content items; determine a respective first score for each of the set of content items, where the first score, for one of the set of content items, may reflect a measure of quality of the one of the set of content items; determine a topic distribution for each of the set of content items, where the topic distribution, for the one of the set of content items, may indicate a topic conveyed by the one of the set of content items; assign a second score to the particular channel, where the second score may reflect a measure of quality of the particular channel; determine a particular term for which the particular channel is authoritative based on the first scores, the topic distributions, and the second score; and store information identifying the particular channel as authoritative for the particular term, where a new content item, associated with the particular channel and relating to the particular term, may be promoted in search results for a search query relating to the particular term.

Additionally, or alternatively, the one or more computer devices, when determining the topic distribution for each of the set of content items, may generate, for the one of the set of content items, a count value reflecting a quantity of occurrences of each of a set of terms associated with the one of the set of content items, and determine the topic distribution, for the one of the set of content items, based on the count value for one or more of the set of terms that are associated with the topic.

Additionally, or alternatively, the one or more computer devices, when determining the particular term for which the particular channel is authoritative, may calculate, for the particular channel and relative to the particular term, a quality score based on the first scores, a value of the topic distribution corresponding to the particular term, and the second score, where the quality score may indicate a measure of quality of the particular channel relative to the particular term, and use the quality score to determine that the particular channel is authoritative for the particular term.

Additionally, or alternatively, the one or more computer devices may further determine a quantity of the set of content items included in the particular channel; determine whether the quantity satisfies a threshold; and modify the quality score, for the particular channel, based on whether the quantity satisfies the threshold, to obtain a modified quality score, where the one or more computer devices, when using the quality score, may use the modified quality score to determine that the particular channel is authoritative for the particular term.

Additionally, or alternatively, the one or more computer devices may determine an age of the particular channel; and modify the quality score, for the particular channel, based on the age of the particular channel, to obtain a modified quality score, where the one or more computer devices, when using the quality score, may use the modified quality score to determine that the particular channel is authoritative for the particular term.

Additionally, or alternatively, the one or more computer devices, when using the quality score, may determine that the quality score satisfies a threshold, and identify the particular channel as authoritative for the particular term based on the quality score satisfying the threshold.

Additionally, or alternatively, the one or more computer devices may determine a time period since a last content item, of the set of content items, relating to the particular term, was added to the particular channel; and modify the quality score, for the particular channel, based on the time period, to obtain a modified quality score, where the one or more computer devices, when using the quality score, may use the modified quality score to determine that the particular channel is authoritative for the particular term.

Additionally, or alternatively, the one or more computer devices may further determine a frequency at which content items, of the set of content items, relating to the particular term, are added to the particular channel; and modify the quality score, for the particular channel, based on the frequency, to obtain a modified quality score, where the one or more computer devices, when using the quality score, may use the modified quality score to determine that the particular channel is authoritative for the particular term.

Additionally, or alternatively, the one or more computer devices may further receive a search query that includes the particular term; generate a list of search results relevant to the received search query; identify a set of authoritative channels that have been identified as authoritative for the particular term, where the set of authoritative channels may include the particular channel; assign scores to the set of authoritative channels based on whether the particular term is associated with the set of authoritative channels; and select one or more of the authoritative channels based on the scores, where the particular channel may be one of the one or more authoritative channels.

According to some possible implementations, a computer-readable medium may include a set of instructions which, when executed by one or more processors of one or more computer devices, causes the one or more processors to identify a particular channel of a set of channels that provide content, where the particular channel may include a set of content items; determine a respective first score for each of the set of content items, where the first score, for one of the set of content items, may reflect a measure of quality of the one of the set of content items; determine a topic distribution for each of the set of content items, where the topic distribution, for the one of the set of content items, may indicate a topic conveyed by the one of the set of content items; assign a second score to the particular channel, where the second score may reflect a measure of quality of the particular channel; determine a particular term for which the particular channel is authoritative based on the first scores, the topic distributions, and the second score; and store information identifying the particular channel as authoritative for the particular term, where a new content item, associated with the particular channel and relating to the particular term, may be promoted in search results for a search query relating to the particular term.

Additionally, or alternatively, the set of instructions may further cause the one or more processors to receive a search query that includes the particular term; generate a list of search results relevant to the received search query; identify, based on the stored information, the particular channel as authoritative for the particular term; identify the new content item associated with the particular channel, where the new content item may have been added to the particular channel more recently than the set of content items were added to the particular channel; determine to promote the new content item in the list of search results; modify, based on determining to promote the new content item, the list of search results to promote the new content item; and provide the list of search results with the promoted new content item.

Additionally, or alternatively, one or more instructions, of the set of instructions, to determine the particular term for which the particular channel is authoritative may cause the one or more processors to calculate, for the particular channel and relative to the particular term, a quality score based on the first scores, a value of the topic distribution corresponding to the particular term, and the second score, and where one or more instructions, of the set of instructions, to determine to promote the new content item in the list of search results may cause the one or more processors to assign a third score to the new content item based on the quality score for the particular channel, and determine that the new content item is to be promoted when the third score satisfies a threshold.

Additionally, or alternatively, one or more instructions, of the set of instructions, to determine to promote the new content item in the list of search results may cause the one or more processors to determine that the particular term is associated with the new content item, and determine that the new content item is to be promoted when the particular term is associated with the new content item.

Additionally, or alternatively, one or more instructions, of the set of instructions, to modify the list of search results to promote the new content item may cause the one or more processors to place information regarding the new content item towards a top of the list of search results.

Additionally, or alternatively, the set of instructions may further cause the one or more processors to monitor the new content item, after promoting the new content item, to determine whether the new content item gains popularity; and penalize the new content item or the particular channel based on determining that the new content item fails to gain popularity.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 2 is a diagram of an example environment in which systems and/or methods described herein may be implemented;

FIGS. 8-12 illustrate an example of promoting fresh video content; and

DETAILED DESCRIPTION

The following detailed description refers to the accompanying drawings. The same reference numbers in different drawings may identify the same or similar elements.

A system and/or method, as described herein, may promote fresh content items that are associated with authoritative channels. Users sometimes like to access fresh content items, yet some systems struggle to present fresh content items because the fresh content items have not yet accumulated enough signals to assess the quality of the fresh content items. Certain channels may have produced high quality content items, with respect to certain topics, in the past and may, thus, produce high quality content items, with respect to these same topics, in the future. These channels may be referred to herein as authoritative channels with respect to these topics.

A channel, as used herein, is to be interpreted broadly to include a collection of content items associated with a particular provider of content—e.g., an up-loader of content, a generator of content, etc. For example, a video channel may refer to a collection of video content items associated with a particular video provider. An audio channel may refer to a collection of audio content items associated with a particular audio provider. A web channel may refer to a collection of web page content items associated with a particular website. A news channel may refer to a collection of news article content items associated with a particular news provider. An image channel may refer to a collection of image content items associated with a particular image provider. A blog channel may refer to a collection of blog post content items associated with a particular blog. The preceding are merely examples of channels. Other types of channels are possible.

A content item, as used herein, may refer to content associated with a particular channel. Further to the example channels identified above, examples of content items may include video data, audio data, web pages, news articles, images, blog posts, or the like. A fresh content item, as used herein, may refer to a content item that has been added, to a channel, less than a threshold amount of time ago. The threshold amount of time may be set by a system administrator, and could possibly be set at A minutes, A hours, or A days—where A is an integer.

An authoritative channel, as used herein, may refer to a channel that has been identified as producing high quality content items. High quality may refer to a measure of quality that satisfies a threshold.

Figure 1A:
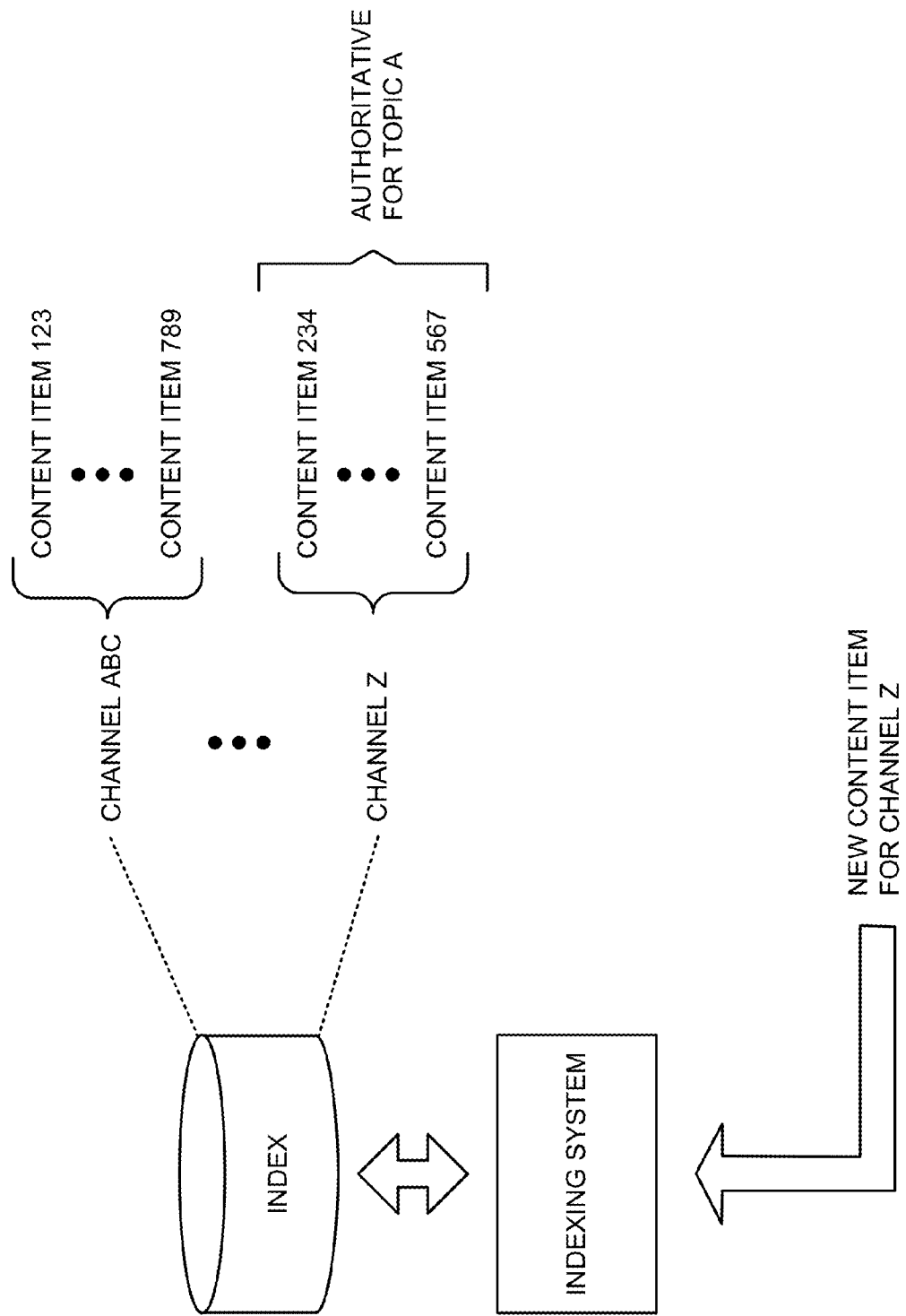
FIGS. 1A and 1B are diagrams illustrating an overview of an example implementation described herein.
Figure 1B:
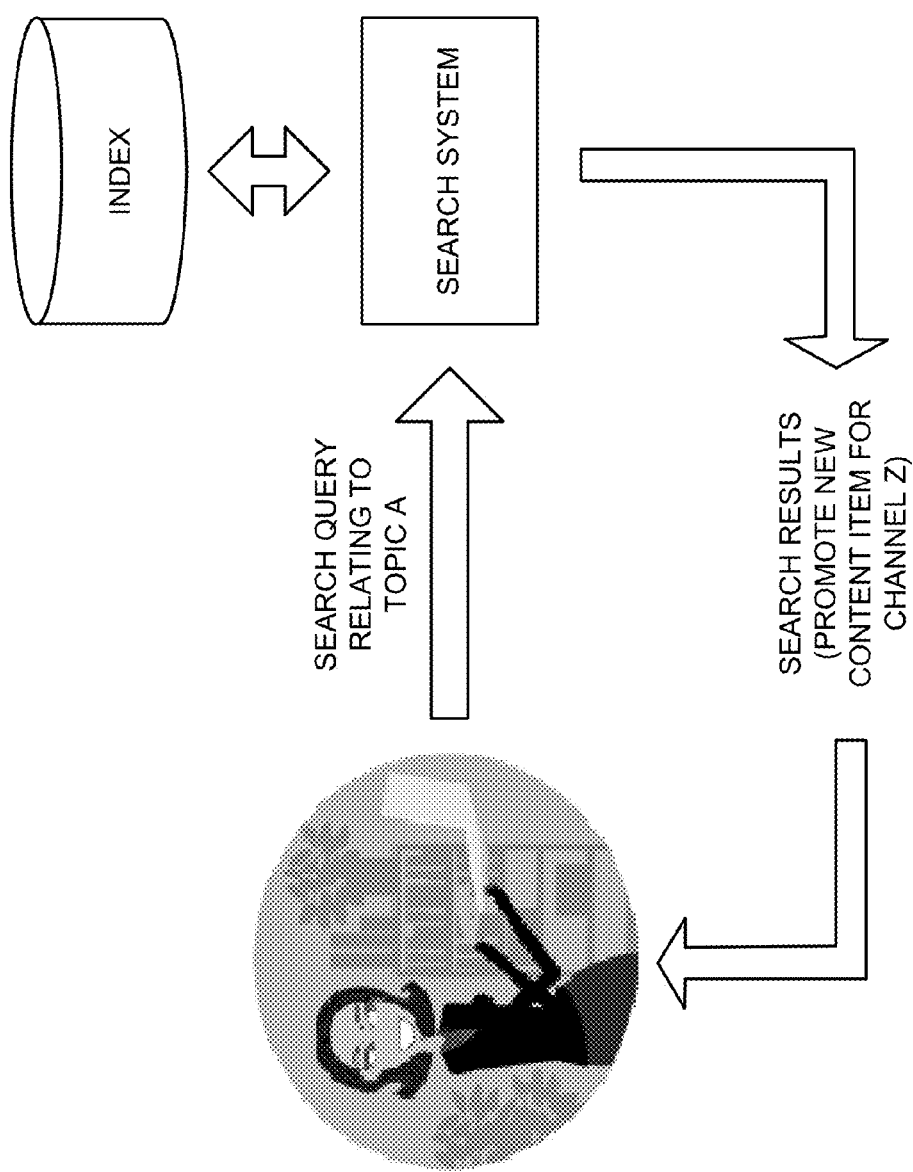

FIGS. 1A and 1B are diagrams illustrating an overview of an example implementation described herein. As shown in FIG. 1A, assume that an indexing system has stored, in an index, information regarding a number of channels and the content items associated with the channels. As also shown in FIG. 1A, assume that "channel ABC" has associated content items, including content item 123 through content item 789; and that "channel Z" has associated content items, including content item 234 through content item 567. Further assume that the indexing system processes the channels and identifies channel Z as authoritative for a particular topic, shown as "topic A." Finally, assume that at some point, the indexing system receives a new content item, relating to topic A, for channel Z.

Turning now to FIG. 1B, assume that a user submits a search query, relating to topic A, to a search system. The search system may search the index, associated with the indexing system, to identify content items relevant to the search query. The search system may form a list of search results that includes information regarding the relevant content items. Because the search query relates to topic A and channel Z has been identified as authoritative for topic A, the search system may promote the new content item for channel Z. For example, the search system may modify the list of search results to provide information, regarding the new content item, towards a top of the list of search results. The search system may provide the modified list of search results to the user. In this manner, the user may easily access fresh content relating to a topic in which the user is interested.

By identifying authoritative channels for respective topics in the past, fresh content items, associated with those channels, may be promoted even before the fresh content items have accumulated enough quality signals to warrant the fresh content items being presented towards a top of a list of search results relevant to the respective topics. A particular channel that has been identified as authoritative for one topic may not be authoritative for another topic. For example, an authoritative channel for football may not be an authoritative channel for cooking.

FIG. 2 is a diagram of an example environment 200 in which systems and/or methods described herein may be implemented. Environment 200 may include multiple user devices 210 connected to indexing system 220, search system 230, and multiple servers 240 via a network 250.

User device 210 may include a client device, or a collection of client devices, that is capable of communicating via a network, such as network 250. Examples of user device 210 may include a smart phone, a personal digital assistant, a laptop, a tablet computer, a personal computer, a watch, a gaming device, or a combination of these and/or other devices. User device 210 may include one or more browsers, which can be used to search for content items.

Indexing system 220 may include a server device or a collection of server devices which may be co-located or remotely located. Indexing system 220 may identify content items and store information, associated with the content items, in an index. Indexing system 220 may also determine whether a particular channel is authoritative with respect to a particular topic and store information, associated with this determination, in the index. The term "index" may generally refer to one or more indexes, which may be co-located or remotely located.

Search system 230 may include a server device or a collection of server devices which may be co-located or remotely located. Search system 230 may receive a search query from a user device 210 and identify content items that are relevant to the search query. Search system 230 may form a list of search results corresponding to the relevant content items. Search system 230 may determine whether to promote information regarding a fresh—e.g., recently added—content item and modify the list of search results based on a result of the determination. Search system 230 may provide the list of search results and, when appropriate, the promoted fresh content item, to user device 210.

While search system 230 is shown as separate from indexing system 220, it may be possible for search system 230 to perform one or more of the functions described as being performed by indexing system 220 and/or indexing system 220 to perform one or more of the functions described as being performed by search system 230. It may also be possible for indexing system 220 and search system 230 to be implemented within a common server device or a common collection of server devices. It may also be possible for a user device 210 to perform one or more of the functions described as being performed by indexing system 220 or search system 230.

Server 240 may include a server device or a collection of server devices that may be co-located or remotely located. Any two or more of servers 240 may be implemented within a common server device or a common collection of server devices. Servers 240 may host content items. In some implementations, one or more of servers 240 may be affiliated with a same entity (e.g., party, organization, business, company, etc.) as indexing system 220 and/or search system 230. In some implementations, none of servers 240 may be affiliated with the same entity as indexing system 220 or search system 230.

Network 250 may include any type of network, such as a local area network ("LAN"), a wide area network ("WAN"), a telephone network, such as the Public Switched Telephone Network ("PSTN") or a cellular network, an intranet, the Internet, or a combination of networks. User devices 210, indexing system 220, search system 230, and servers 240 may connect to network 250 via wired and/or wireless connections. In other words, any one of user devices 210, indexing system 220, search system 230, and/or servers 240 may connect to network 250 via a wired connection, a wireless connection, or a combination of a wired connection and a wireless connection.

Two user devices 210, one indexing system 220, one search system 230, and two servers 240 have been illustrated in FIG. 2 as connected to network 250 for simplicity. In practice, there may be additional or fewer user devices, indexing systems, search systems, servers, and/or networks. Also, in some instances, one of the devices illustrated in FIG. 2 may perform a function described below as being performed by another one of the devices illustrated in FIG. 2.

Figure 3:
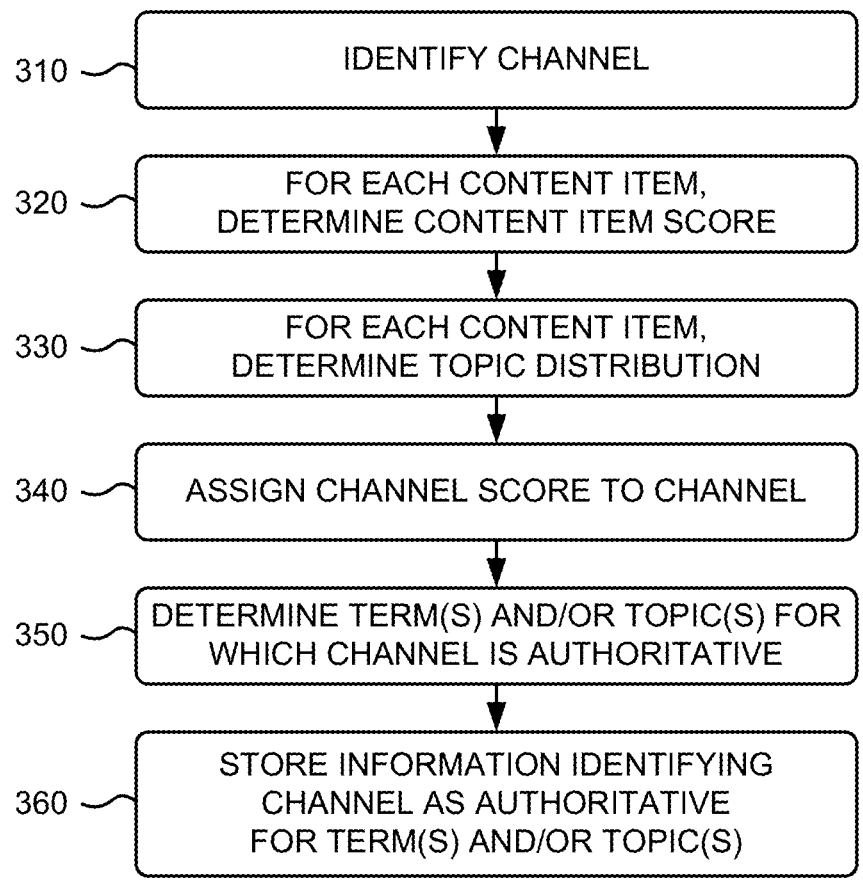
FIG. 3 is a flowchart of an example process for determining authoritative channels.

FIG. 3 is a flowchart of an example process 300 for determining authoritative channels. In some implementations, process 300 may be performed by indexing system 220. In some implementations, one or more blocks of process 300 may be performed by one or more devices instead of, or possibly in conjunction with, indexing system 220, such as search system 230 and/or user device 210.

Process 300 may include identifying a channel (block 310). Indexing system 220 may process channels to gather certain information regarding the channels. Indexing system 220 may select a channel to process from a set of available channels. In some implementations, indexing system 220 may concurrently process multiple channels at the same time. In some implementations, indexing system 220 may process a single channel at a time.

Process 300 may include determining a content item score for each content item (block 320). For example, indexing system 220 may analyze the content items associated with the channel. For each content item, indexing system 220 may calculate a content item score, which may represent a measure of quality of the content item—e.g., how well the content item has performed in the past. For example, indexing system 220 may calculate the content item score, for a content item, based on one or more quality signals associated with the content item, such as a quantity of times that the content item has been accessed by users; a click through rate or ratio relating to a quantity of times that the content item has been selected relative to a total quantity of times that the content item has been presented for selection; information regarding an amount of time that users spent accessing the content item; a quantity of times that the content item has been presented as a search result; users' ratings of the content item; a quantity of times that the content item has been added as a favorite; a quality score assigned to the content item; information regarding an age of the content item; information regarding a history of rankings of the content item when presented as a search result; or other data that may reflect a measure of quality of the content item. In some implementations, signals relating to activities of users may be anonymized.

Indexing system 220 may use a single quality signal or a combination of quality signals to calculate the content item score. When indexing system 220 uses multiple quality signals to calculate the content item score, indexing system 220 may assign different weights to the different quality signals. In other words, the amount that different quality signals contribute to the calculation of the content item score may differ. Indexing system 220 may also, or alternatively, assign weights to the quality signals based on respective ages of the quality signals. For example, in some implementations, indexing system 220 may assign a higher weight to a more recent quality signal and a lower weight to a less recent quality signal. This may also be true for multiple data points for the same quality signal. For example, indexing system 220 may assign a higher weight to a more recent user rating of a content item and a lower weight to a less recent user rating of the content item.

Process 300 may include determining a topic distribution for each content item (block 330). For example, indexing system 220 may estimate, for each content item, a topic distribution of the content item which may reflect the topic, or topics, that the content item conveys. For example, indexing system 220 may determine the topic distribution by counting occurrences of terms associated with the content item. These terms may appear in the content of the content item or appear in metadata associated with the content item. The metadata may include a title of the content item, a description of the content item, a transcription of the content item, keywords that have been associated with the content item, a name of the channel with which the content item is associated, keywords that have been associated with the channel, a description of the channel, or other data that may reflect a topic of the content item.

In addition to terms that appear in the content of the content item or the metadata associated with the content item, indexing system 220 may count occurrences of terms related to the terms that appear in the content of the content item or the metadata associated with the content item, such as stems of the terms, synonyms of the terms, or the like. For example, indexing system 220 may count occurrences of the terms "run," "runs," "running," "jog," "jogs," "jogging," "sprint," "sprints," "sprinting," etc. as all corresponding to the term "run." In some implementations, indexing system 220 may apply a stemming technique to the terms prior to counting occurrences of the terms. For example, indexing system 220 may change the terms "jogs," "jogged," and "jogging" to the term "jog" for purposes of counting the occurrences of the term "jog."

In addition to stems and synonyms, indexing system 220 may identify other terms that are related to the terms that appear in the content of the content item or the metadata associated with the content item. For example, indexing system 220 may use a knowledge base, domain knowledge, or the like, to determine related terms. Assume that a knowledge base indicates that "Fly Me to the Moon" is a song from Frank Sinatra. In this case, indexing system 220 may relate the term "Fly Me to the Moon" with "Frank Sinatra" for purposes of counting occurrences of the term "Sinatra" or "Frank Sinatra."

In some implementations, indexing system 220 may assign weights to the counts of terms based on where the terms appear. For example, indexing system 220 may assign a higher weight to a count of a term that appears in a title of the content item and a lower weight to a count of a term that appears in a transcription or content of the content item. The weighting may serve to boost the count of a term that is more likely to reflect the topic associated with the content item than the count of a term that is less likely to reflect the topic associated with the content item. Indexing system 220 may determine that the content item is more likely related to a topic associated with a higher count than a topic associated with a lower count. These counts may be referred to hereinafter as "distribution values."

In some implementations, indexing system 220 may determine the topic distribution of a content item using another technique. For example, indexing system 220 may use a categorization technique, such as machine learning, fuzzy logic, or the like, to match the content item to a topic in a set of topics. In this situation, the distribution value, for a content item, may reflect a probability of the content item matching a particular topic—and thus, a term associated with that particular topic.

Process 300 may include assigning a channel score to the channel (block 340). For example, indexing system 220 may calculate a channel score for a channel, which may represent a measure of quality of the channel. In some implementations, indexing system 220 may calculate the channel score based on one or more quality signals associated with the channel, such as a quantity of users who have subscribed to the channel; a quantity of times that a content item, associated with the channel, has been accessed by users; a quantity of times that a content item, associated with the channel, has been presented as a search result; a click through rate or ratio relating to a quantity of times that a content item, associated with the channel, has been selected relative to a total quantity of times that a content item, associated with the channel, has been presented for selection; information regarding an amount of time that users spent accessing a content item associated with the channel; information regarding an amount of time that users spent browsing content items associated with the channel; users' ratings of the channel and/or content items associated with the channel; a quantity of times that the channel or a content item, associated with the channel, has been added as a favorite; a quality score assigned to the channel or to content items associated with the channel; information regarding an age of the channel; information regarding a history of rankings of content items, associated with the channel, when presented as search results; or other data that may reflect a measure of quality of the channel. In some implementations, signals relating to activities of users may be anonymized.

Indexing system 220 may use a single quality signal or a combination of quality signals to calculate the channel score. When indexing system 220 uses multiple quality signals to calculate the channel score, indexing system 220 may assign different weights to the different quality signals. In other words, the amount that different quality signals contribute to the calculation of the channel score may differ. Indexing system 220 may also, or alternatively, assign weights to the quality signals based on respective ages of the quality signals. For example, in some implementations, indexing system 220 may assign a higher weight to a more recent quality signal and a lower weight to a less recent quality signal. This may also be true for multiple data points for the same quality signal. For example, indexing system 220 may assign a higher weight to a more recent user rating of a channel and a lower weight to a less recent user rating of the channel.

Process 300 may include determining term(s) and/or topic(s) for which the channel is authoritative (block 350). For example, indexing system 220 may analyze the channel with regard to different terms to determine a set of topics with which the channel is associated. For example, indexing system 220 may form channel-term pairs for each combination of a channel and a term. In some implementations, indexing system 220 may pair a channel only with those terms that have been associated with the channel as part of the topic distribution determination. In some implementations, indexing system 220 may pair a channel with each term in a set of terms, which is independent of the topic distribution determination.

Indexing system 220 may determine whether the channel is authoritative with respect to a particular term based on the content item scores of the content items associated with the channel, the distribution values for the particular term, and the channel score of the channel. Indexing system 220 may use different techniques to make the ultimate determination of whether the channel is authoritative with respect to a topic associated with the particular term. Some example techniques, which may be used to make this determination, are described below with regard to FIGS. 5 and 6.

Process 300 may include storing information identifying the channel as authoritative for the term(s) and/or topic(s) (block 360). For example, indexing system 220 may store information, in a data structure, that identifies the channel as authoritative for the term(s) and/or the topic(s) with which the term(s) are associated. Examples of data structures that may store the information identifying the channel as authoritative are described below with regard to FIGS. 4A and 4B.

Process 300 may be repeated for each channel in the set of available channels. As a result of repeatedly performing process 300 for the set of available channels, a data structure may be populated to reflect which channels are authoritative for which terms and/or topics. Some channels may be authoritative for multiple terms, while some other channels may be authoritative for no terms or topics. Process 300 may be performed offline—e.g., independent of and not in response to a search query.

While FIG. 3 shows process 300 as including a particular quantity and arrangement of blocks, in some implementations, process 300 may include fewer blocks, additional blocks, or a different arrangement of blocks. Additionally, or alternatively, some of the blocks may be performed in parallel.

Figure 4A:
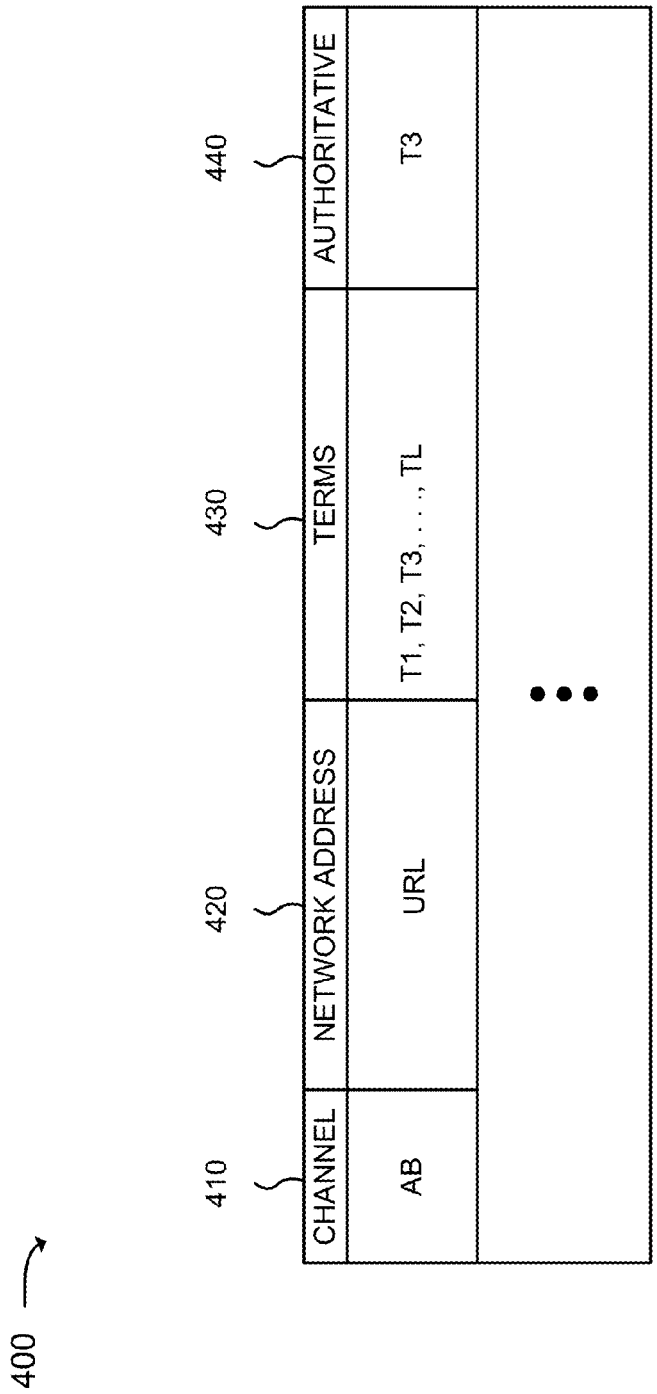
FIGS. 4A and 4B are diagrams of example data structures.

FIG. 4A is a diagram of an example data structure 400. In some implementations, data structure 400 may be stored in a memory within indexing system 220 or search system 230. In some implementations, data structure 400 may be stored in a memory separate from, and accessible by, indexing system 220 and/or search system 230. In some implementations, data structure 400 may be part of an index that is accessible by indexing system 220 and/or search system 230.

As shown in FIG. 4A, data structure 400 may include a channel field 410, a network address field 420, a terms field 430, and an authoritative field 440. Channel field 410 may store information that identifies a particular channel. The information, stored in channel field 410, may include a channel identifier, a channel name, or any other string of characters that uniquely identifies the particular channel. Network address field 420 may store a network address, such as a uniform resource locator (URL), a uniform resource identifier (URI), an Internet protocol (IP) address, or some other address that uniquely identifies the channel on a network, such as network 250.

Terms field 430 may store a list of terms that are associated with the particular channel. The terms, for terms field 430, may be derived from various sources, such as a name of the particular channel, keywords that have been associated with the particular channel, a description of the particular channel, a title of a content item associated with the particular channel, a description of a content item associated with the particular channel, a transcription of a content item associated with the particular channel, keywords that have been associated with a content item associated with the particular channel, or the like.

Authoritative field 440 may store information regarding one or more terms for which the particular channel has been identified as authoritative. Some techniques, for identifying terms for which a particular channel is authoritative, have been identified above.

While FIG. 4A shows data structure 400 as having a particular number of fields, in some implementations, data structure 400 may include additional fields, different fields, or fewer fields. For example, data structure 400 may store a list of topics that are associated with the particular channel instead of, or in addition to, a list of terms.

Figure 4B:
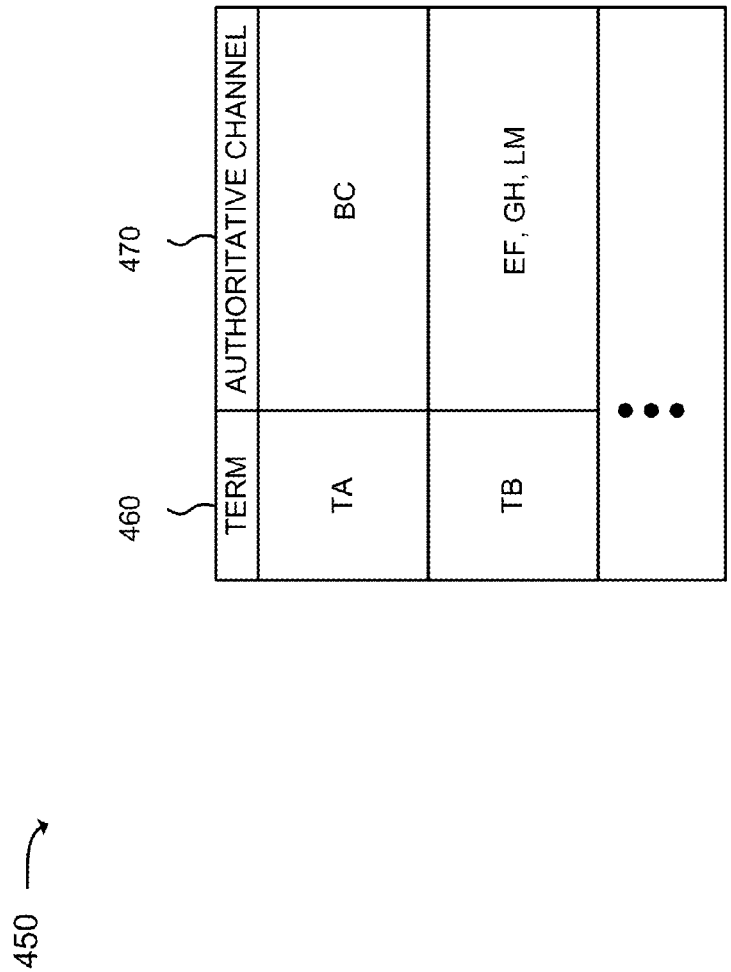

FIG. 4B is a diagram of an example data structure 450. In some implementations, data structure 450 may be stored in a memory within indexing system 220 or search system 230. In some implementations, data structure 450 may be stored in a memory separate from, and accessible by, indexing system 220 and/or search system 230. In some implementations, data structure 450 may be part of an index that is accessible by indexing system 220 and/or search system 230.

As shown in FIG. 4B, data structure 450 may include a term field 460 and an authoritative channel field 470. Term field 460 may store information regarding a particular term. Data structure 450 may include a separate entry, in term field 460, for each possible term. Authoritative channel field 470 may store information identifying channels that have been identified as authoritative for the particular term. Authoritative channel field 470 may identify no authoritative channel, a single authoritative channel, or multiple authoritative channels. An authoritative channel may be identified using a channel identifier, a channel name, or some other character string that uniquely identifies the authoritative channel.

While FIG. 4B shows data structure 450 as having a particular number of fields, in some implementations, data structure 450 may include additional fields, different fields, or fewer fields. For example, data structure 450 may include a topic field instead of, or in addition to, term field 460.

Figure 5:
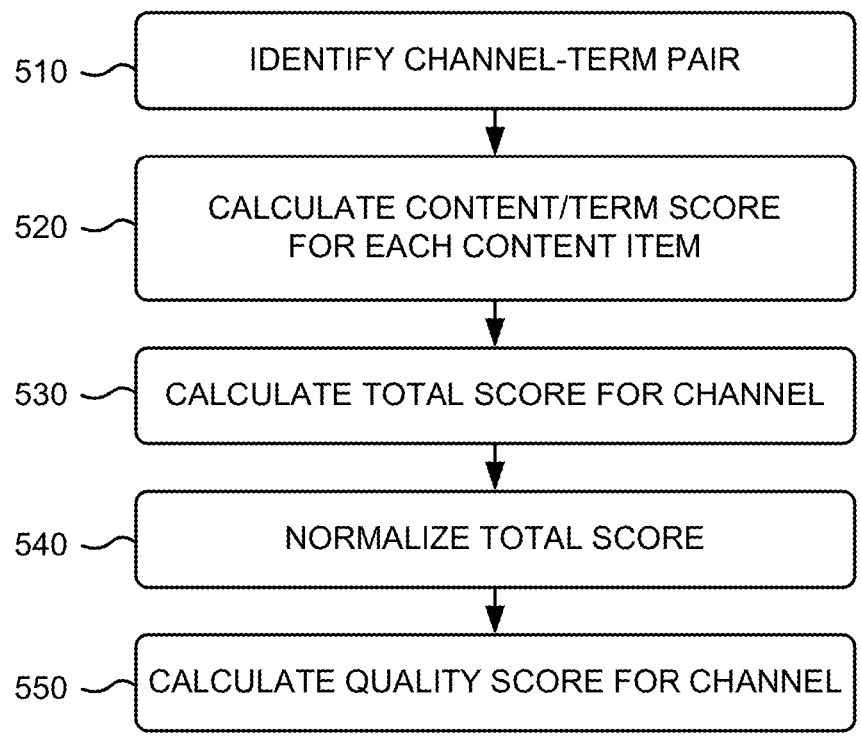
FIGS. 5 and 6 are flowcharts of an example process for determining whether a channel is authoritative with regard to particular terms.
Figure 6:
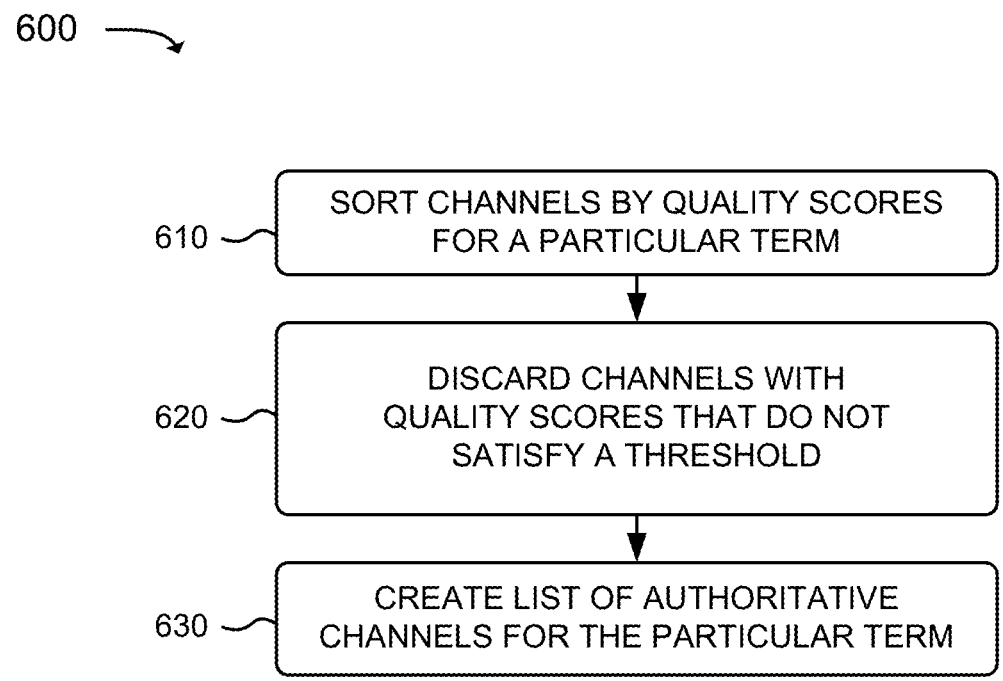

FIGS. 5 and 6 are flowcharts of example processes 500 and 600 for determining whether a channel is authoritative with regard to particular terms. In some implementations, processes 500 and 600 may be performed by indexing system 220. In some implementations, one or more blocks of process 500 and/or process 600 may be performed by one or more devices instead of, or possibly in conjunction with, indexing system 220, such as search system 230 and/or user device 210.

Turning initially to FIG. 5, process 500 may be performed for each combination of a channel and a term. As described previously, there may be many available channels and many possible terms.

Process 500 may include identifying a channel-term pair (block 510). For example, as described above, indexing system 220 may match a channel with a term to form a channel-term pair for consideration. In some implementations, indexing system 220 may concurrently process multiple channel-term pairs at the same time. In some implementations, indexing system 220 may process a single channel-term at a time.

Process 500 may include calculating, for each content item associated with the channel of the channel-term pair, a content/term score (block 520). For example, for each content item associated with the channel, indexing system 220 may calculate a content/term score based on the content item score, for the content item, and the distribution value for the term. In some implementations, indexing system 220 may combine the content item score and the distribution value to achieve the content/term score. For example, indexing system 220 may multiply the content item score and the distribution value, sum the content item score and the distribution value, or combine the content item score and the distribution value using another technique, such as a weighted combination.

Process 500 may include calculating a total score for the channel (block 530). For example, indexing system 220 may calculate a total score, for the channel relative to the term, based on the content/term scores of the content items associated with the channel. In some implementations, indexing system 220 may combine the content/term scores to achieve the total score. For example, indexing system 220 may multiply the content/term scores, sum the content/term scores, or combine the content/term scores using another technique, such as a weighted combination.

Process 500 may include normalizing the total score for the channel (block 540). For example, indexing system 220 may normalize the total score for the channel. In some implementations, indexing system 220 may normalize the total score based on a total quantity of content items associated with the channel.

Process 500 may include calculating a quality score for the channel relative to the term (block 550). For example, indexing system 220 may calculate a quality score based on the normalized total score and the channel score. The quality score may reflect a measure of quality, or the authoritativeness, of the channel with respect to a topic associated with the term. For example, a quality score that satisfies a threshold may reflect that the channel is authoritative for a topic associated with the term.

In some implementations, indexing system 220 may combine the normalized total score and the channel score to achieve the quality score for the channel. For example, indexing system 220 may multiply the normalized total score and the channel score, sum the normalized total score and the channel score, or combine the normalized total score and the channel score using another technique, such as a weighted combination.

Due to the normalization based on the quantity of content items, a channel may need to have a consistent focus on a particular term in order for the channel to be identified as an authoritative channel for the term. For example, if a channel has three high quality content items relating to ping pong and one hundred content items relating to other topics, the channel probably will not be recognized as an authoritative channel for ping pong.

The normalization may favor channels with smaller quantities of content items over channels with larger quantities of content items. To address this issue, indexing system 220 may penalize the quality scores of channels with small quantities of content items—e.g., quantities that do not satisfy a first threshold—and/or boost the quality scores of channels with large quantities of content items—e.g., quantities that satisfy a second threshold. Many different techniques exist for penalizing a quality score or boosting a quality score.

In some implementations, the quality score for a channel may be adjusted based on the age and/or performance of the channel. For example, if a particular channel has a relatively large quantity of subscribers and/or a relatively large quantity of accesses compared to similar channels of approximately the same age as the particular channel, the quality score for the particular channel may be boosted and/or the quality scores for the similar channels may be penalized. Many different techniques exist for penalizing a quality score or boosting a quality score.

Additionally, or alternatively, the quality score for a channel, relative to a particular term, may be adjusted based on a time period since content items, for the channel and relating to the particular term, were updated. In some implementations, a time decay function may be used over this time period. As a result, if a channel updates its content items relating to a particular term recently—e.g., relative to a time threshold or relative to other channels relating to the particular term, the quality score of the channel, relative to the particular term, may be boosted. Similarly, if a channel has not updated its content items relating to a particular term for a long time—e.g., relative to a time threshold or relative to other channels relating to the particular term, the quality score of the channel, relative to the particular term, may be penalized.

Additionally, or alternatively, the quality score for a channel, relative to a particular term, may be adjusted based on a frequency that content items, for the channel and relating to the particular term, are updated. For example, if a channel updates its content items relating to a particular term frequently—e.g., relative to a frequency threshold or relative to other channels relating to the particular term, the quality score of the channel, relative to the particular term, may be penalized. Similarly, if a channel updates its content items relating to a particular term infrequently—e.g., relative to a frequency threshold or relative to other channels relating to the particular term, the quality score of the channel, relative to the particular term, may be boosted.

While some specific examples of techniques for determining a quality score for a channel are described above, other techniques may alternatively be used or the above-identified example techniques may be modified in other implementations.

While FIG. 5 shows process 500 as including a particular quantity and arrangement of blocks, in some implementations, process 500 may include fewer blocks, additional blocks, or a different arrangement of blocks. Additionally, or alternatively, some of the blocks may be performed in parallel.

Turning now to FIG. 6, process 600 may be performed for multiple channels relative to a particular term. As described previously, there may be many available channels and many possible terms. Process 600 may be repeated for each possible term.

Process 600 may include sorting the channels by quality scores for a particular term (block 610). For example, for the particular term, indexing system 220 may sort the channels by their quality scores to create a sorted list of channels.

Process 600 may include discarding channels with quality scores that do not satisfy a threshold (block 620). For example, indexing system 220 may discard channels, from consideration as an authoritative channel for the particular term, that have quality scores that do not satisfy a particular threshold.

Process 600 may include creating a list of authoritative channels for the particular term (block 630). For example, indexing system 220 may create a list from the channels that have not been discarded. In some implementations, indexing system 220 may select the top-scoring X channels to include in the list; where X may equal one, two, five, ten, or any other number. In some implementations, indexing system 220 may select all channels with quality scores that satisfy a threshold or the top-scoring X channels with quality scores that satisfy the threshold. Indexing system 220 may store the list in a data structure in association with the particular term. Indexing system 220 may create such a list for each possible term. As a result of the above processing, indexing system 220 may create and/or populate one or more data structures, such as data structure 400 of FIG. 4A or data structure 450 of FIG. 4B.

While FIG. 6 shows process 600 as including a particular quantity and arrangement of blocks, in some implementations, process 600 may include fewer blocks, additional blocks, or a different arrangement of blocks. For example, block 620 may be eliminated in situations where indexing system 220 creates the list based on top-scoring channels or channels with scores that satisfy a threshold. Additionally, or alternatively, some of the blocks may be performed in parallel.

Figure 7A:
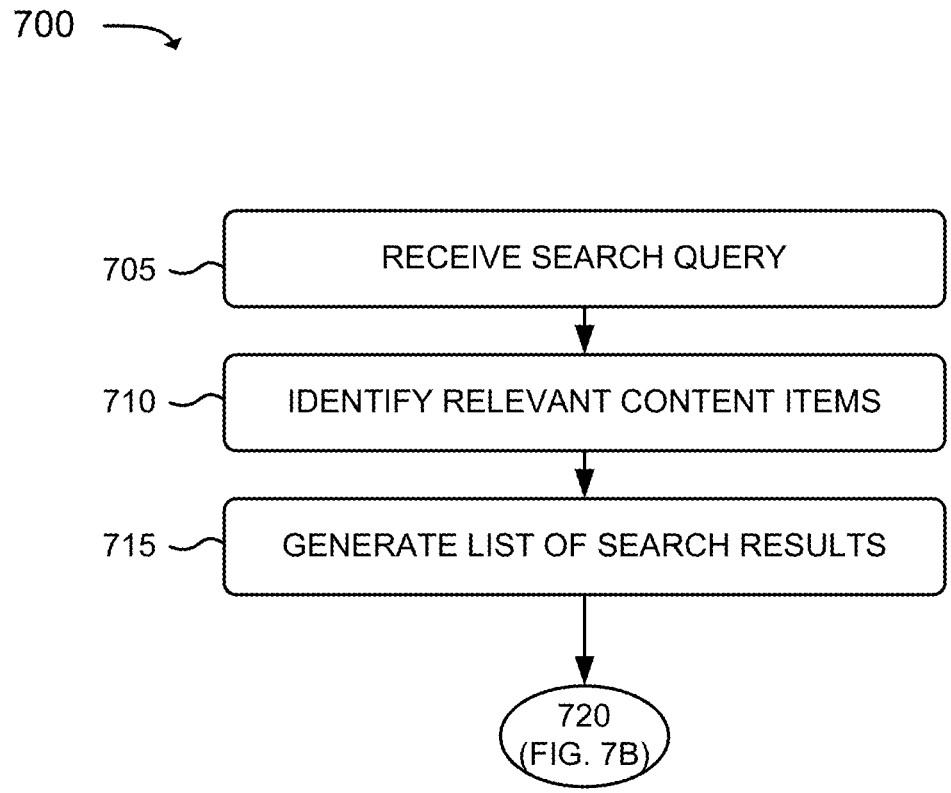
FIGS. 7A and 7B are flowcharts of an example process for providing search results.
Figure 7B:
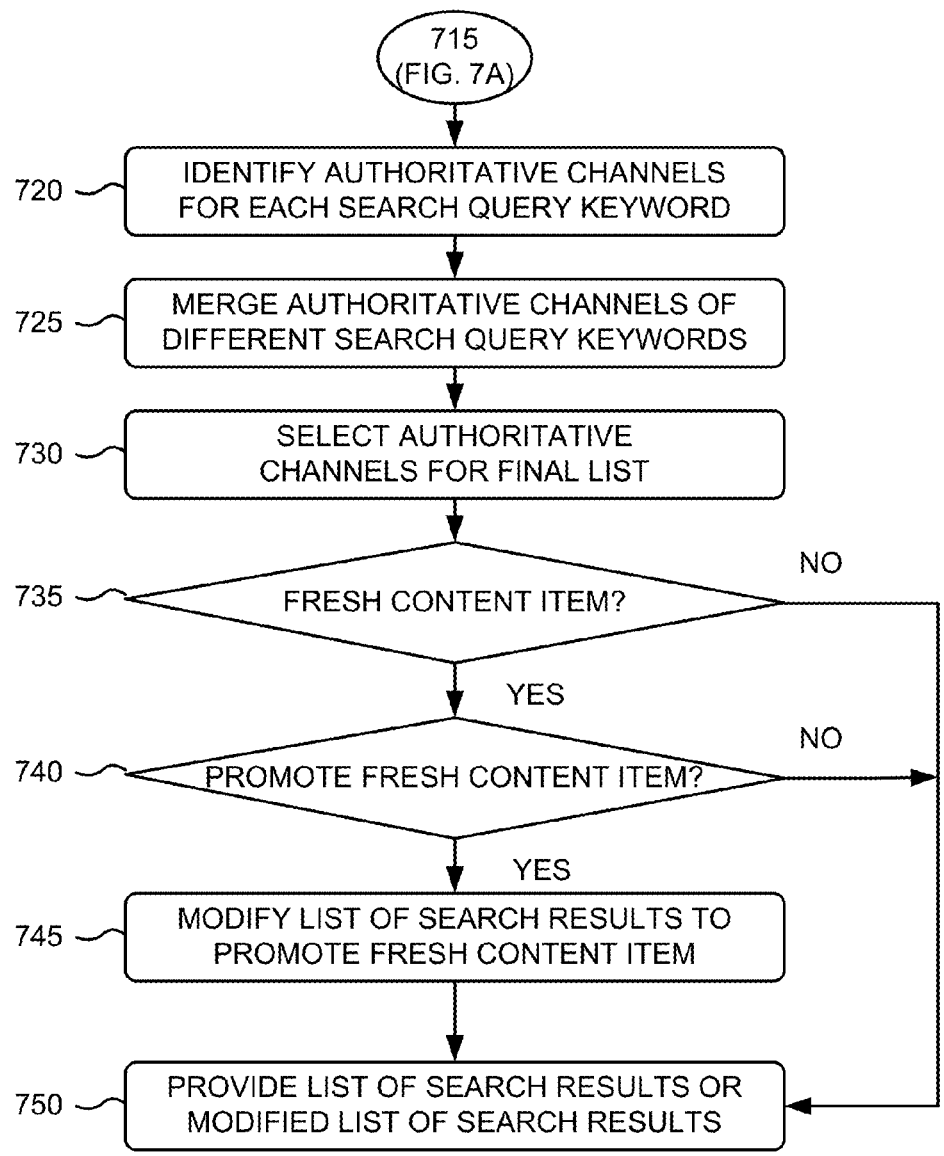

FIGS. 7A and 7B are flowcharts of an example process 700 for providing search results. In some implementations, process 700 may be performed by search system 230. In some implementations, one or more blocks of process 700 may be performed by one or more devices instead of, or possibly in conjunction with, search system 230, such as indexing system 220 and/or user device 210.

Process 700 may include receiving a search query (block 705) (FIG. 7A). For example, a user may input a search query into a browser application executing on a user device 210. User device 210 may transmit the search query to search system 230. Search system 230 may receive the search query from user device 210 and parse the search query to identify the keyword(s) that the search query contains. Assume, for purposes of this example, that the search query includes multiple keywords.

Process 700 may include identifying relevant content items (block 710). For example, search system 230 may perform a search to identify relevant content items. Information regarding content items may be stored in one or more indexes. Search system 230 may perform a search of the one or more indexes using the keywords of the search query.

Process 700 may include generating a list of search results (block 715). For example, search system 230 may determine a score for each of the relevant content items. The score, for a relevant content item, may correspond to a quality score and/or a relevance score for the relevant content item. The quality score may correspond to a measure of quality of the relevant content item irrespective of a search query. The relevance score may correspond to a measure of relevance of the relevant content item to a search query. Search system 230 may determine the score, for a relevant content item, based only on the quality score, based only on the relevance score, or based on a combination of the quality score and the relevance score. Search system 230 may sort information, associated with the relevant content items based on the scores of the relevant content items, to form a list of search results. Each search result may include information identifying a relevant content item, such as a title of the relevant content item, a snippet or summary of the relevant content item, a link to the relevant content item, or the like.

Process 700 may include identifying authoritative channels for each search query keyword (block 720) (FIG. 7B). For example, search system 230 may perform a look-up in a data structure, such as data structure 450, to identify channels that have been identified as authoritative for a particular keyword. Thus, for each keyword in the search query, search system 230 may identify a set of channels—e.g., with zero or more channels in each set—that have been identified as authoritative for the keyword.

Process 700 may include merging the authoritative channels of different search query keywords (block 725). For example, search system 230 may merge the sets of channels that have been identified as authoritative for the keywords of the search query. In some implementations, keywords, of the search query, may be assigned different weights. In other words, one of the keywords may be treated as more influential—e.g., by having a higher weight—to the selection of an authoritative channel than another one of the keywords—e.g., by having a lower weight. Search system 230 may assign a score to a particular authoritative channel based on the weight assigned to the respective keyword. In some implementations, search system 230 may sort the authoritative channels, in a list, based on the respective scores.

Process 700 may include selecting authoritative channels for a final list (block 730). For example, search system 230 may select a set of the authoritative channels from the list to form a final list. In some implementations, search system 230 may select L authoritative channels for the final list, such as the top-scoring L authoritative channels from the list—e.g., L=1, 2, 5, etc. In some implementations, search system 230 may select, for the final list, all authoritative channels with respective scores that satisfy a threshold.

Process 700 may include determining whether any of the authoritative channels, in the final list, include a fresh content item (block 735). For example, search system 230 may analyze the content items, associated with the authoritative channels, to determine whether any of the content items are fresh—e.g., have been added to the respective authoritative channel less than a threshold amount of time ago. Each content item, identified in the index, may have a timestamp that indicates when the content item was added to the channel. Search system 230 may analyze this timestamp to determine whether a particular content item is fresh.

If an authoritative channel has a fresh content item (block 735—YES), process 700 may include determining whether to promote the fresh content item (block 740). For example, in some implementations, search system 230 may assign a score to the fresh content item based on the score of the authoritative channel with which the fresh content item is associated. In these implementations, search system 230 may determine that the fresh content item should be promoted when the score, of the fresh content item, satisfies a threshold. In some implementations, search system 230 may determine whether a term, associated with the fresh content item, matches one of the keywords of the search query. In these implementations, search system 230 may determine that the fresh content item should be promoted when a term, associated with the fresh content item, matches one of the keywords of the search query. In some implementations, search system 230 may determine that the fresh content item should be promoted when the score, of the fresh content item, satisfies a threshold and when a term, associated with the fresh content item, matches one of the keywords of the search query. In some implementations, search system 230 may use some other criteria to determine whether to promote the fresh content item.

In the situation where multiple authoritative channels, in the final list, have fresh content items that should be promoted, search system 230 may select one or more of the fresh content items to promote. In some implementations, search system 230 may select to promote all of the fresh content items. In some implementations, search system 230 may select fewer than all of the fresh content items, such as the top-scoring M fresh content items—e.g., M=1, 2, 5, etc.

If the fresh content item should be promoted (block 740—YES), process 700 may include modifying the list of search results to promote the fresh content item (block 745). For example, search system 230 may use a particular technique to promote the fresh content item within the list of search results. Examples of techniques that may be used to promote a fresh content item include marking the fresh content item in some manner to distinguish the fresh content item from other content items in the list of search results when the list of search results is rendered; moving the fresh content item to a top of the list of search results; moving the fresh content item up P positions within the list of search results—e.g., P=1, 2, 5, 10, etc.; moving the fresh content item to a position within the top Q positions in the list of search results—e.g., Q=5, 10, 15, 20, etc.; moving the fresh content item to a first page of the list of search results; changing the score of the fresh content item by a particular amount; or a combination of these or different techniques.

Process 700 may include providing the list of search results or the modified list of search results (block 750). For example, search system 230 may generate a document that includes the list of search results or the modified list of search results. In a situation where none of the authoritative channels has a fresh content item (block 735—NO) or where a fresh content item should not be promoted (block 740—NO), search system 230 may generate the document based on the list of search results. In a situation where the list of search results has been modified to promote a fresh content item (block 745), search system 230 may generate the document based on the modified list of search results. Search system 230 may send the document to user device 210. User device 210 may receive the document, from search system 230, and present the document for display in, for example, a window of the browser application.

In some implementations, once a fresh content item has been promoted, that fresh content item may be monitored to determine whether its quality signals reflect that the fresh content item is gaining in popularity. In a situation where the quality signals, of the fresh content item, do not reflect that the fresh content item is gaining in popularity, the fresh content item may be removed as a candidate for future promotions. Also, or alternatively, the channel, associated with the fresh content item, may be penalized in some manner. For example, the quality score for the channel may be penalized with regard to the term for which the channel had been identified as authoritative. Additionally, or alternatively, the channel may be removed from the list of authoritative channels for the term for which the channel was previously identified as authoritative.

While FIG. 7 shows process 700 as including a particular quantity and arrangement of blocks, in some implementations, process 700 may include fewer blocks, additional blocks, or a different arrangement of blocks. Additionally, or alternatively, some of the blocks may be performed in parallel.

FIGS. 8-11 illustrate an example of promoting fresh video content. As shown in FIG. 8, assume that the total set of video channels includes three video channels, shown as the AWG channel, the JEN channel, and the BIG channel. Assume that the AWG channel includes one hundred video content items—all relating to football. Assume that the JEN channel includes one hundred video content items—fifty relating to cooking and fifty relating to various other topics. Assume that the BIG channel includes one hundred video content items relating to various topics.

The indexing system may process the video channels, using techniques similar to those described above, to determine whether the video channels are authoritative for any particular topics. The indexing system may determine that the AWG channel is authoritative for football since all of the video content items, of the AWG channel, relate to football. The indexing system might determine that the JEN channel is authoritative for cooking since fifty percent of the video content items relate to cooking. Alternatively, the indexing system might determine that the JEN channel is not authoritative for any topic since only fifty percent of the video content items relate to a single topic. The indexing system may determine that the BIG channel is not authoritative for any topic since the video content items relate to various topics.

Figure 9:
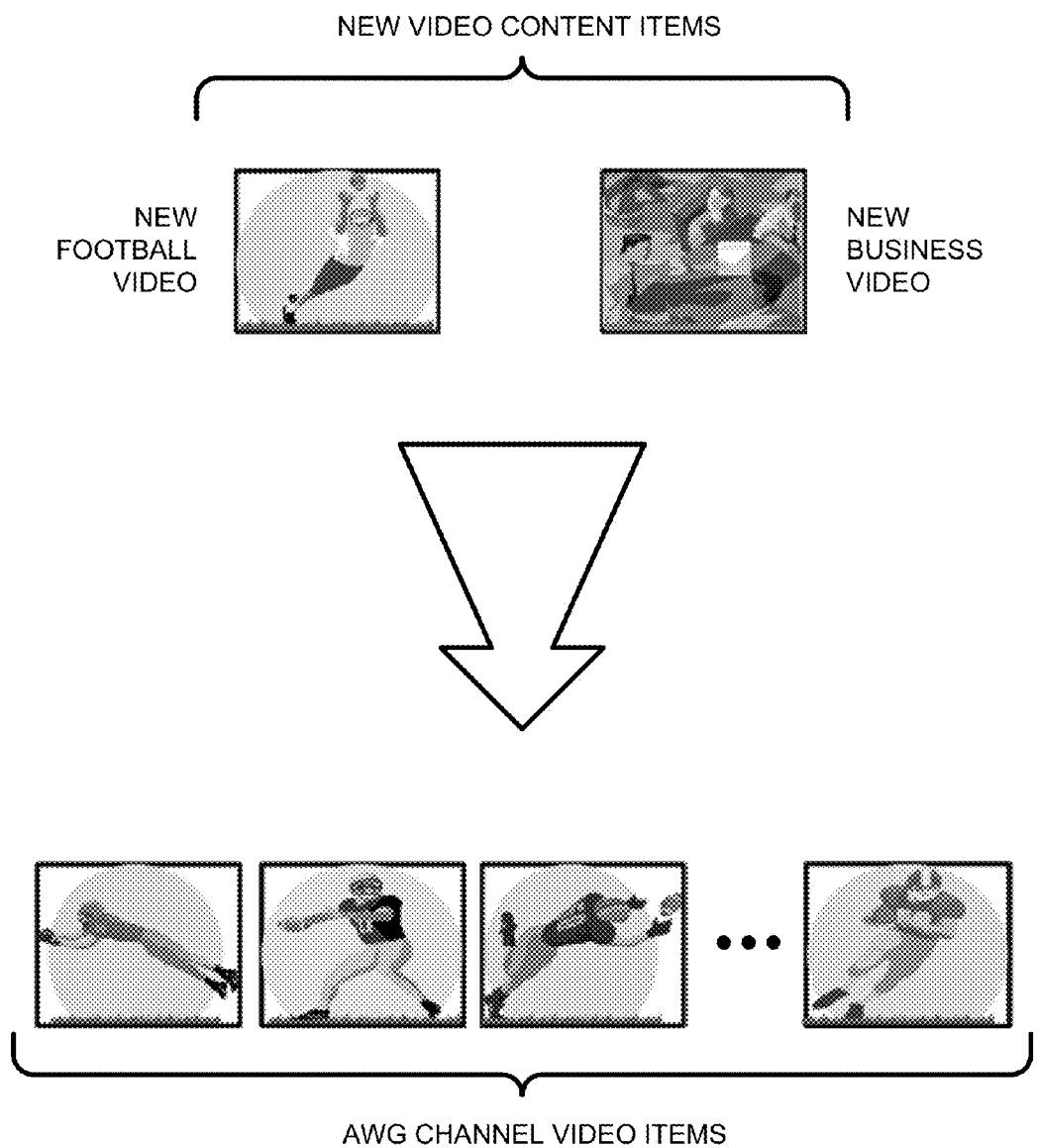

As shown in FIG. 9, assume that two new video content items are added to the AWG channel. One of these video content items corresponds to a new football video, and the other video content item corresponds to a new business video. As a result of these new video content items, the AWG channel includes one hundred and two video content items—one hundred and one of which relate to football and one of which relates to business.

Figure 10:
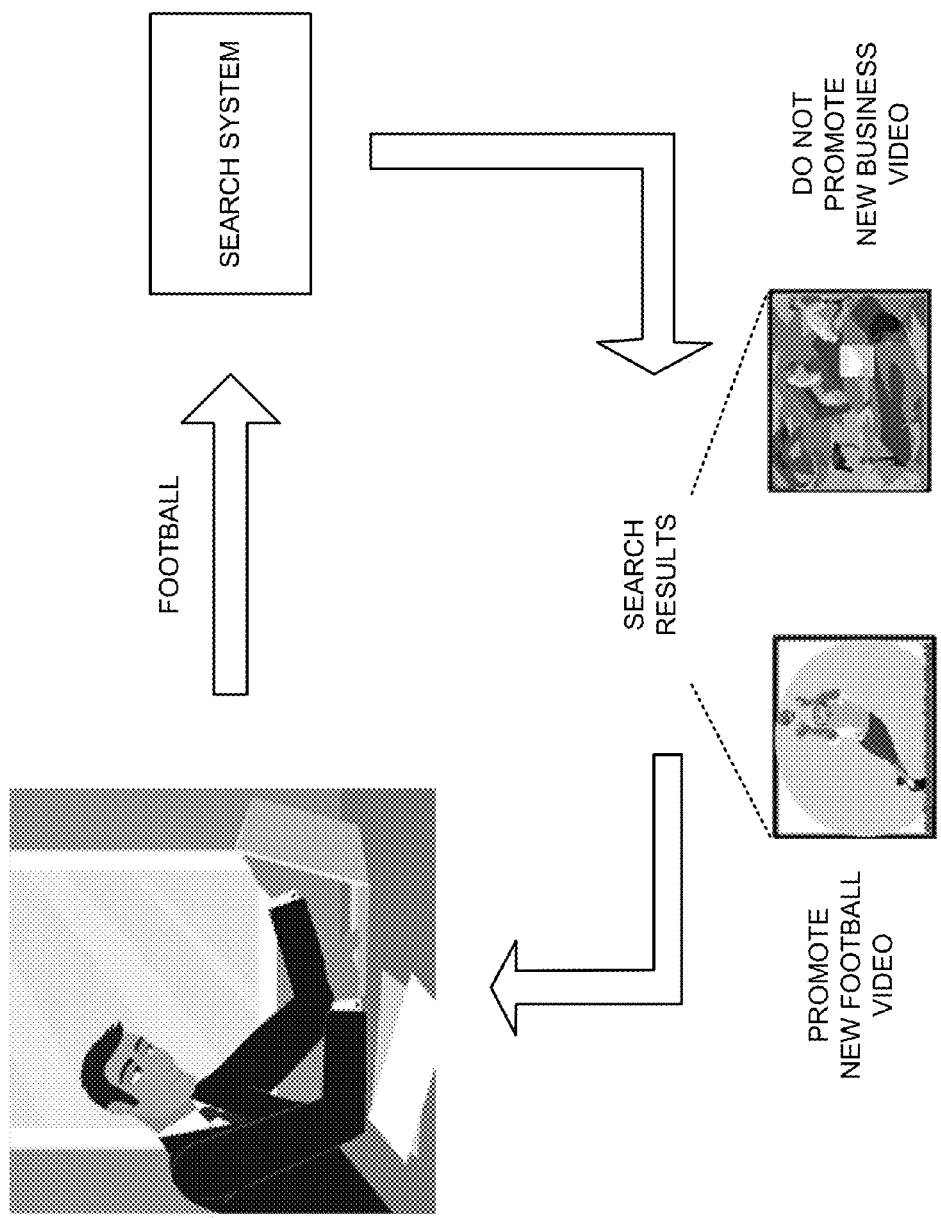

As shown in FIG. 10, assume that a user desires to perform a video search for videos relating to the keyword "football." The user may input a search query, including the keyword "football," into a browser application on the user's computer. The user's computer may transmit the search query to the search system. The search system may perform a search to identify video content items that relate to football. Assume that the search system identifies video content items relating to the AWG channel, which has been identified as being authoritative for the term "football."

The search system may identify the new video content items for the AWG channel as fresh video content items. The search system may determine that the new business video, of the AWG channel, should not be promoted since, for example, terms associated with the new business video do not match the keyword "football." On the other hand, the search system may determine that the new football video, of the AWG channel, should be promoted since, for example, a term associated with the new football video matches the keyword "football." Thus, the search system may modify the list of search results to promote the new football video even though the new football video has not yet gathered enough quality signals to warrant appearing towards a top of the list of search results. The search system may send the modified list of search results for display in a window of the browser application on the user's computer.

Figure 11:
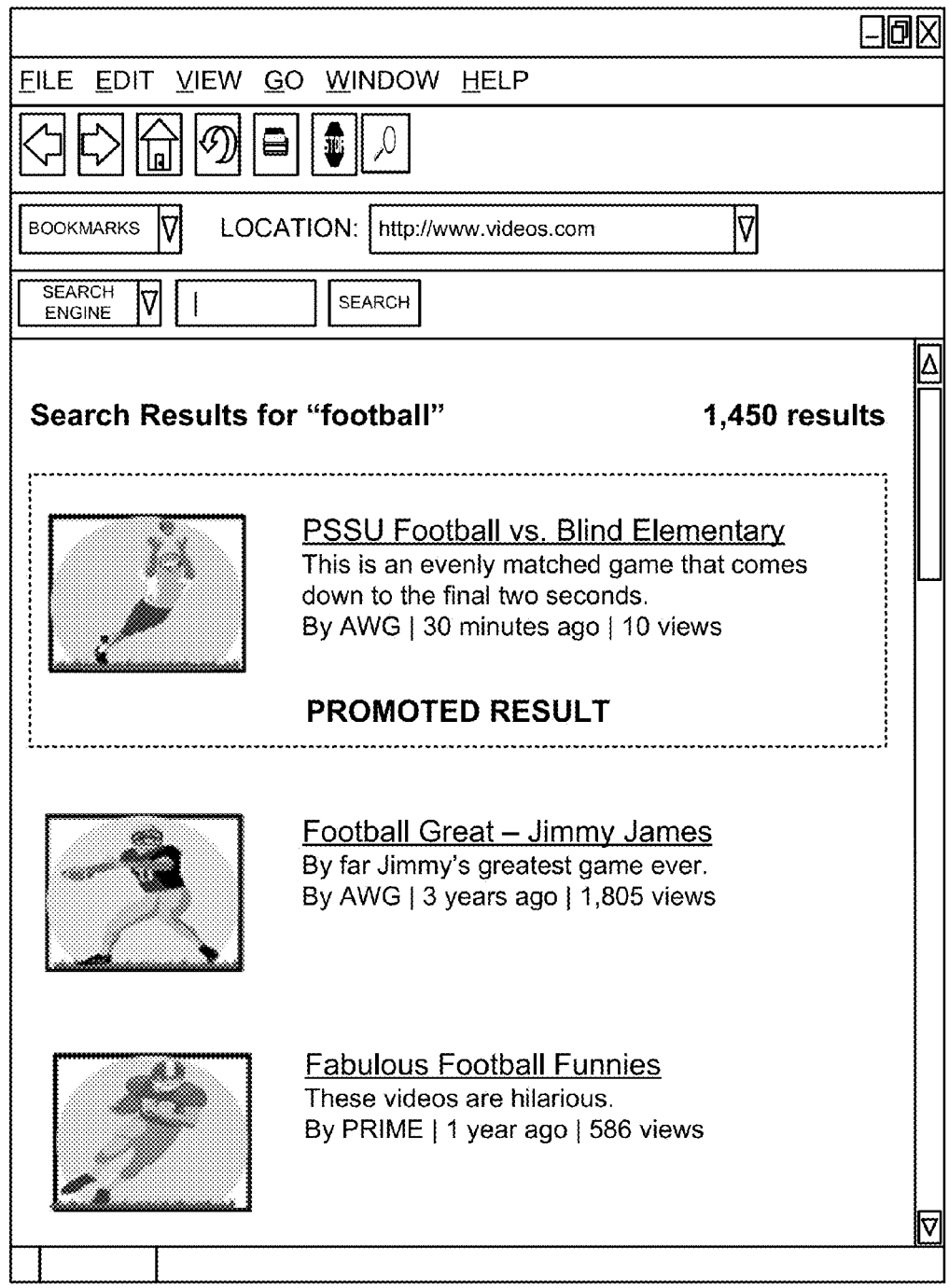

FIG. 11 shows one example of promoting the fresh video content. As shown in FIG. 11, the modified list of search results may include the promoted fresh video content item corresponding to the new football video. As shown in FIG. 11, the fresh video content item, corresponding to the new football video, may be promoted, when the modified list of search results is rendered by the user's computer, by moving the fresh video content item to the top of the list of search results, by marking the fresh video content item with a dotted box around the fresh video content item to separate the fresh video content item from other video content items, and by adding a "PROMOTED RESULT" label to the fresh video content item.

Figure 12:
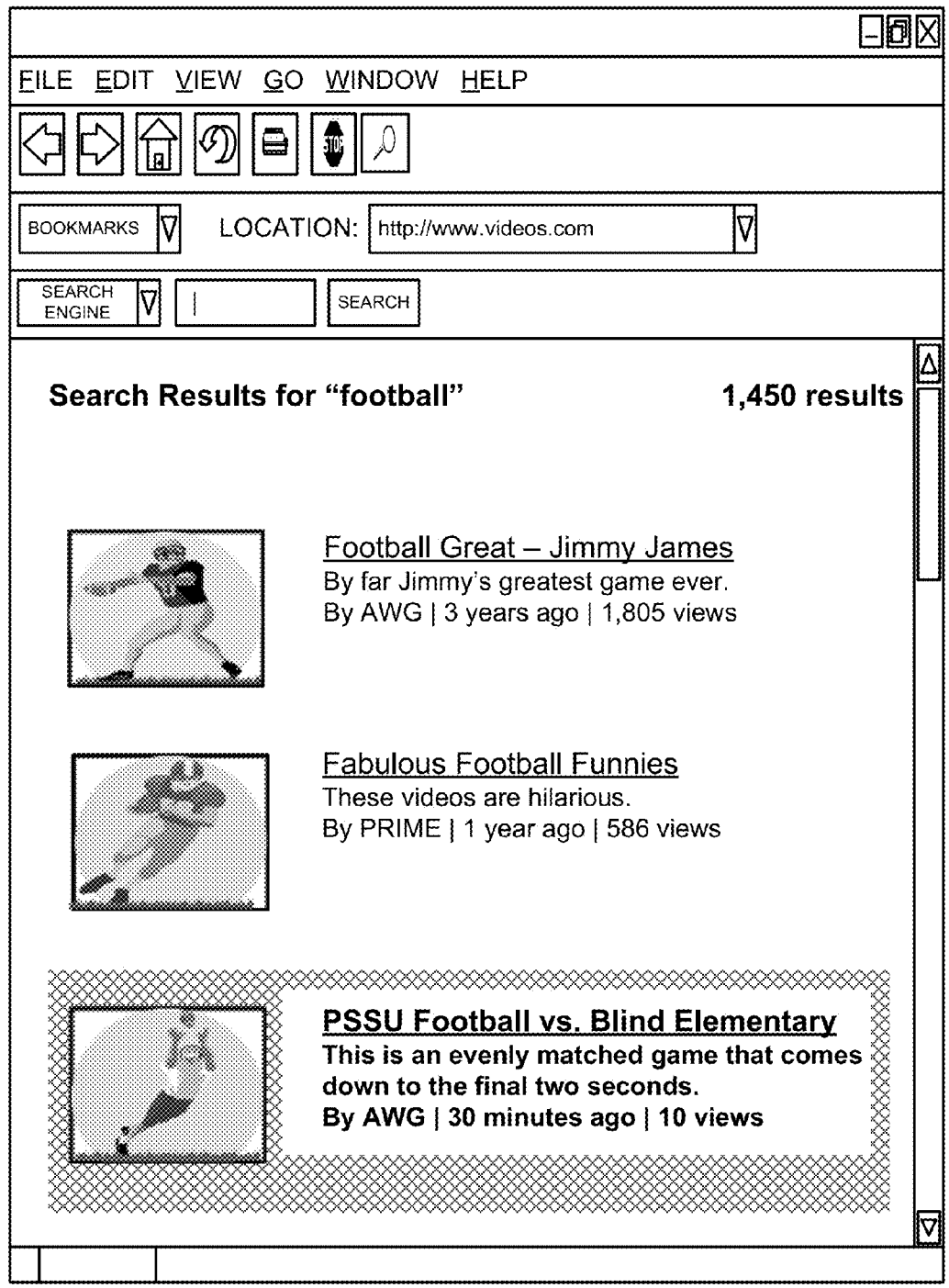

FIG. 12 shows another example of promoting the fresh video content. As shown in FIG. 12, the modified list of search results may include the promoted fresh video content item corresponding to the new football video. As shown in FIG. 12, the fresh video content item, corresponding to the new football video, may be promoted, when the modified list of search results is rendered by the user's computer, by increasing the score of the fresh video content item, by marking the fresh video content item with a shaded background around the fresh video content item to separate the fresh video content item from other video content items, and by bolding the text associated with the fresh video content item.

Promoting fresh video content may assist a user in finding video content of interest, such as a popular video that has been added recently, to a video channel, relative to the user's search query submission.

While the above example related to video content, other examples may relate to audio content, web content, news content, image content, or the like. These other types of content may be processed similarly to the video content described above.

Figure 13:
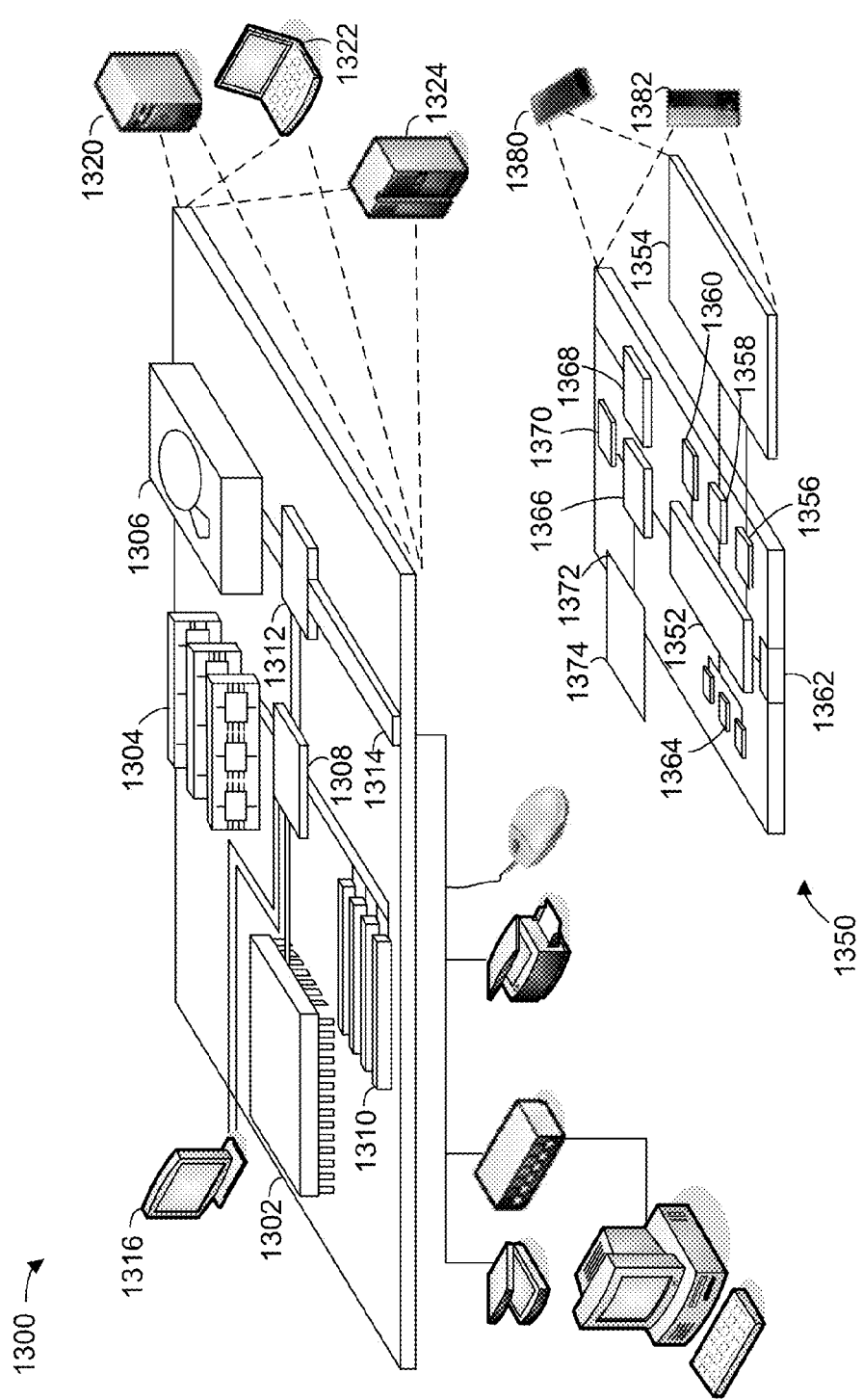
FIG. 13 is a diagram of an example of a generic computer device and a generic mobile computer device.

FIG. 13 is a diagram of an example of a generic computing device 1300 and a generic mobile computing device 1350, which may be used with the techniques described here. Generic computing device 1300 or generic mobile computing device 1350 may correspond to, for example, a user device 210, indexing system 220, search system 230, and/or server 240. Each of user device 210, indexing system 220, search system 230, and/or server 240 may include one or more computing devices 1300, one or more mobile computing devices 1350, and/or one or more components of computing device 1300 or mobile computing device 1350.

Computing device 1300 is intended to represent various forms of digital computers, such as laptops, desktops, workstations, personal digital assistants, servers, blade servers, mainframes, and other appropriate computers. Mobile computing device 1350 is intended to represent various forms of mobile devices, such as personal digital assistants, cellular telephones, smart phones, and other similar computing devices. The components shown in FIG. 13, their connections and relationships, and their functions, are meant to be examples only, and are not meant to limit implementations described herein.

Computing device 1300 may include a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various busses, and may be mounted on a common motherboard or in other manners as appropriate. Processor 1302 can process instructions for execution within the computing device 1300, including instructions stored in the memory 1304 or on the storage device 1306 to display graphical information for a graphical user interface (GUI) on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations, as a server bank, a group of blade servers, or a multi-processor system, etc.

Memory 1304 stores information within the computing device 1300. In one implementation, memory 1304 includes a volatile memory unit or units. In another implementation, memory 1304 includes a non-volatile memory unit or units. The memory 1304 may also be another form of computer-readable medium, such as a magnetic or optical disk. A computer-readable medium may refer to a non-transitory memory device. A memory device may refer to storage space within a single storage device or spread across multiple storage devices.

The storage device 1306 is capable of providing mass storage for the computing device 1300. In one implementation, storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 1304, storage device 1306, or memory on processor 1302.

High speed controller 1308 manages bandwidth-intensive operations for the computing device 1300, while low speed controller 1312 manages lower bandwidth-intensive operations. Such allocation of functions is an example only. In one implementation, high-speed controller 1308 is coupled to memory 1304, display 1316 (e.g., through a graphics processor or accelerator), and to high-speed expansion ports 1310, which may accept various expansion cards (not shown). In this implementation, low-speed controller 1312 is coupled to storage device 1306 and low-speed expansion port 1314. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as mobile computing device 1350. Each of such devices may contain one or more of computing devices 1300, 1350, and an entire system may be made up of multiple computing devices 1300, 1350 communicating with each other.

Mobile computing device 1350 may include a processor 1352, memory 1364, an input/output ("I/O") device, such as a display 1354, a communication interface 1366, and a transceiver 1368, among other components. Mobile computing device 1350 may also be provided with a storage device, such as a micro-drive or other device, to provide additional storage. Each of the components 1350, 1352, 1364, 1354, 1366, and 1368 are interconnected using various buses, and several of the components may be mounted on a common motherboard or in other manners as appropriate.

Processor 1352 can execute instructions within mobile computing device 1350, including instructions stored in memory 1364. Processor 1352 may be implemented as a chipset of chips that include separate and multiple analog and digital processors. Processor 1352 may provide, for example, for coordination of the other components of mobile computing device 1350, such as control of user interfaces, applications run by mobile computing device 1350, and wireless communication by mobile computing device 1350.

Processor 1352 may communicate with a user through control interface 1358 and display interface 1356 coupled to a display 1354. Display 1354 may be, for example, a TFT LCD (Thin-Film-Transistor Liquid Crystal Display) or an OLED (Organic Light Emitting Diode) display, or other appropriate display technology. Display interface 1356 may comprise appropriate circuitry for driving display 1354 to present graphical and other information to a user. Control interface 1358 may receive commands from a user and convert them for submission to the processor 1352. In addition, an external interface 1362 may be provide in communication with processor 1352, so as to enable near area communication of mobile computing device 1350 with other devices. External interface 1362 may provide, for example, for wired communication in some implementations, or for wireless communication in other implementations, and multiple interfaces may also be used.

Memory 1364 stores information within mobile computing device 1350. Memory 1364 can be implemented as one or more of a computer-readable medium or media, a volatile memory unit or units, or a non-volatile memory unit or units. Expansion memory 1374 may also be provided and connected to mobile computing device 1350 through expansion interface 1372, which may include, for example, a SIMM (Single In Line Memory Module) card interface. Such expansion memory 1374 may provide extra storage space for device 1350, or may also store applications or other information for mobile computing device 1350. Specifically, expansion memory 1374 may include instructions to carry out or supplement the processes described above, and may include secure information also. Thus, for example, expansion memory 1374 may be provide as a security module for mobile computing device 1350, and may be programmed with instructions that permit secure use of device 1350. In addition, secure applications may be provided via the SIMM cards, along with additional information, such as placing identifying information on the SIMM card in a non-hackable manner.

Expansion memory 1374 may include, for example, flash memory and/or NVRAM memory. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Mobile computing device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to mobile computing device 1350, which may be used as appropriate by applications running on mobile computing device 1350.

Mobile computing device 1350 may also communicate audibly using audio codec 1360, which may receive spoken information from a user and convert it to usable digital information. Audio codec 1360 may likewise generate audible sound for a user, such as through a speaker, e.g., in a handset of mobile computing device 1350. Such sound may include sound from voice telephone calls, may include recorded sound (e.g., voice messages, music files, etc.) and may also include sound generated by applications operating on mobile computing device 1350.

Mobile computing device 1350 may be implemented in a number of different forms, as shown in the figure. For example, it may be implemented as a cellular telephone 1380. It may also be implemented as part of a smart phone 1382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a LAN, a WAN, and the Internet.

A system and method, described herein, may promote fresh content items in certain situations even when the fresh content items have not gathered enough quality signals to warrant appearing towards a top of a search result list.

The foregoing description provides illustration and description, but is not intended to be exhaustive or to limit the implementations to the precise form disclosed. Modifications and variations are possible in light of the above disclosure or may be acquired from practice of the implementations.

For example, some example operations have been described above as being performed with regard to a "term" or a "keyword." These example operations may also, or alternatively, be performed with regard to terms or keywords that are multi-grams—e.g., bigrams, trigrams, etc. For example, in addition to, or rather than, treating the terms or keywords "Eiffel" and "tower" separately, the terms or keywords may be treated as the bigram "Eiffel tower." Thus, the example operations may be performed on the terms or keywords "Eiffel," "tower," and "Eiffel tower."

Further, example operations have been described as being performed relative to particular terms. Generally, a term may be associated with a topic. Thus, operations described as being performed relative to a particular term may be performed relative to a particular topic with which the particular term is associated, or vice versa. In these cases, a term may be synonymous with a topic with which the term is associated. For example, a channel may be identified as authoritative for a particular term and, thus, may be identified as authoritative for a particular topic, or vice versa.

Also, example user interfaces have been described with respect to FIGS. 11 and 12. In other implementations, the user interfaces may include additional, fewer, different, or differently arranged items of information.

In some implementations, user data may be collected. The user data may be anonymized or pseudo-anonymized with regard to the identities of the users associated with the user data.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method performed by one or more computer devices, the method comprising:
    identifying, by at least one of the one or more computer devices, a particular channel of a plurality of channels that provide content,
        the particular channel including a plurality of content items;
    determining, by at least one of the one or more computer devices, a respective first score for each of the plurality of content items,
        the first score, for one of the plurality of content items, reflecting a measure of quality of the one of the plurality of content items;
    determining, by at least one of the one or more computer devices, a topic distribution for each of the plurality of content items,
        the topic distribution, for the one of the plurality of content items, indicating a topic conveyed by the one of the plurality of content items;
    assigning, by at least one of the one or more computer devices, a second score to the particular channel,
        the second score reflecting a measure of quality of the particular channel;
    calculating, by at least one of the one or more computer devices and for each of the plurality of content items, a third score,
        the third score, for the one of the plurality of content items, being calculated relative to the topic conveyed by the one of the plurality of content items and based on the first score determined for the one of the plurality of content items and a value of the topic distribution determined for the one of the plurality of content items;
    calculating, by at least one of the one or more computer devices, a fourth score for the particular channel based on the third score calculated for each of the plurality of content items;
    normalizing, by at least one of the one or more computer devices, the fourth score to obtain a normalized score,
        the fourth score being normalized based on a total quantity of the plurality of content items included in the particular channel;
    calculating, by at least one of the one or more computer devices, a fifth score based on the normalized score and the second score;
    determining, by at least one of the one or more computer devices, a particular topic for which the particular channel is authoritative based on the fifth score;
    determining, by at least one of the one or more computer devices, that a difference between a time at which a new content item, relating to the particular topic, has been added to the particular channel and a current time is less than a threshold amount of time; and
    assigning, by at least one of the one or more computer devices, a sixth score to the new content item based on the fifth score, the particular channel being authoritative for the particular topic, and the difference being less than the threshold amount of time,
        the new content item being promoted in search results for a search query relating to the particular topic based on the sixth score.

2. The method of claim 1, where the particular topic is associated with a particular term, and
where calculating the third score includes:
    calculating, for each content item, of the plurality of content items, and relative to the particular term, the third score based on the first score of the content item and a value of the topic distribution, of the content item, corresponding to the particular term.

3. The method of claim 1, where calculating the fourth score calculated for the particular channel includes:
    combining the third score calculated for each of the plurality of content items.

4. The method of claim 1, further comprising:
    determining whether the total quantity of the plurality of content items is less than a threshold quantity, and
    modifying the fifth score based on whether the total quantity of the plurality of content items is less than the threshold quantity.

5. The method of claim 4, where modifying the fifth score includes:
    penalizing the fifth score when the total quantity of the plurality of content items is less than the threshold quantity.

6. The method of claim 1, further comprising:
    identifying another channel, of the plurality of channels, that has been identified as authoritative for the particular topic; and
    creating a list of authoritative channels for the particular topic,
        the list identifying the particular channel and the other channel.

7. The method of claim 6, further comprising:
    identifying the particular channel as authoritative for the particular topic based on a position of the particular channel in the list.

8. A system, comprising:
one or more computer devices to:
    identify a particular channel of a plurality of channels that provide content,
        the particular channel including a plurality of content items;
    determine a respective first score for each of the plurality of content items,
        the first score, for one of the plurality of content items, reflecting a measure of quality of the one of the plurality of content items;
    determine a topic distribution for each of the plurality of content items,
        the topic distribution, for the one of the plurality of content items, indicating a topic conveyed by the one of the plurality of content items;
    assign a second score to the particular channel,
        the second score reflecting a measure of quality of the particular channel;
    calculate, for each of the plurality of content items, a third score,
        the third score, for the one of the plurality of content items, being calculated relative to the topic conveyed by the one of the plurality of content items and based on the first score determined for the one of the plurality of content items and a value of the topic distribution determined for the one of the plurality of content items;
    calculate a fourth score for the particular channel based on the third score calculated for each of the plurality of content items;
    normalize the fourth score to obtain a normalized score,
        the fourth score being normalized based on a total quantity of the plurality of content items included in the particular channel;

calculate a fifth score based on the normalized score and the second score;
determine a particular topic for which the particular channel is authoritative based on the fifth score;
determine that a difference between a time that a new content item, relating to the particular topic, has been added to the particular channel and a current time is less than a threshold amount of time; and
assign a sixth score to the new content item based on the fifth score, the particular channel being authoritative for the particular topic, and the difference being less than the threshold amount of time,
the new content item being promoted in search results for a search query relating to the particular topic based on the sixth score.

9. The system of claim 8, where the one or more computer devices, when determining the topic distribution for each of the plurality of content items, are to:
generate, for the one of the plurality of content items, a count value reflecting a quantity of occurrences of each of a plurality of terms associated with the one of the plurality of content items in the one of the plurality of content items, and
determine the topic distribution, for the one of the plurality of content items, based on the count value for one or more of the plurality of terms that are associated with the particular topic.

10. The system of claim 8, where the one or more computer devices, when determining the particular topic for which the particular channel is authoritative, are to:
selectively modify the fifth score based on whether the quantity of the plurality of content items satisfies one or more thresholds, and
use the selectively modified fifth score to determine that the particular channel is authoritative for the particular topic.

11. The system of claim 10, where, when selectively modifying the fifth score, the one or more computer devices are further to:
determine whether the quantity of the plurality of content items satisfies a first threshold of the one or more thresholds; and
boost the fifth score when the quantity of the plurality of content items satisfies the first threshold.

12. The system of claim 8, where the one or more computer devices are further to:
determine an age of the particular channel; and
modify the fifth score based on the age of the particular channel.

13. The system of claim 8, where the one or more computer devices, when determining that the particular channel is authoritative for the particular topic, are to:
determine that the fifth score satisfies a threshold, and
identify the particular channel as authoritative for the particular term based on the fifth score satisfying the threshold.

14. The system of claim 8, where the one or more computer devices are further to:
determine a time period since a last content item, of the plurality of content items, relating to the particular topic, was added to the particular channel; and
modify the fifth score based on the time period.

15. The system of claim 8, where the one or more computer devices are further to:
determine a frequency at which content items, of the plurality of content items, relating to the particular topic, are added to the particular channel; and
modify the fifth score based on the frequency.

16. The system of claim 8, where the one or more computer devices are further to:
receive a search query that includes a particular term associated with the particular topic;
generate a list of search results relevant to the received search query;
identify a plurality of authoritative channels that have been identified as authoritative for the particular topic,
the plurality of authoritative channels including the particular channel;
assign scores to the plurality of authoritative channels; and
select one or more of the authoritative channels based on the scores,
the particular channel being one of the one or more authoritative channels.

17. A non-transitory computer-readable medium storing instructions, the instructions comprising:
a plurality of instructions which, when executed by one or more processors of one or more computer devices, causes the one or more processors to:
identify a particular channel of a plurality of channels that provide content,
the particular channel including a plurality of content items;
determine a respective first score for each of the plurality of content items,
the first score, for one of the plurality of content items, reflecting a measure of quality of the one of the plurality of content items;
determine a topic distribution for each of the plurality of content items,
the topic distribution, for the one of the plurality of content items,
indicating a topic conveyed by the one of the plurality of content items;
assign a second score to the particular channel,
the second score reflecting a measure of quality of the particular channel;
calculate, for each of the plurality of content items, a third score,
the third score, for the one of the plurality of content items, being calculated relative to the topic conveyed by the one of the plurality of content items and based on the first score determined for the one of the plurality of content items and a value of the topic distribution determined for the one of the plurality of content items;
calculate a fourth score for the particular channel based on the third score calculated for each of the plurality of content items;
normalize the fourth score to obtain a normalized score,
the fourth score being normalized based on a total quantity of the plurality of content items included in the particular channel;
calculate a fifth score based on the normalized score and the second score;
determine a particular topic for which the particular channel is authoritative based on the fifth score;
determine that a difference between a time that a new content item, relating to the particular topic, has been added to the particular channel and a current time is less than a threshold amount of time; and
assign a sixth score to the new content item based on the fifth score, the particular channel being authoritative for the particular topic, and the difference being less than the threshold amount of time, the new content item being promoted in search results for a search query relating to the particular topic based on the sixth score.

18. The non-transitory computer-readable medium of claim 17, where the plurality of instructions further causes the one or more processors to:
receive a search query that includes a particular term associated with the particular topic;
generate a list of search results relevant to the received search query;
identify the particular channel as authoritative for the particular topic;
identify the new content item associated with the particular channel,
the new content item being added to the particular channel more recently than the plurality of content items were added to the particular channel;
determine to promote the new content item in the list of search results;
modify, based on determining to promote the new content item, the list of search results to promote the new content item; and
provide the list of search results with the promoted new content item.

19. The non-transitory computer-readable medium of claim 18, where one or more instructions, of the plurality of instructions, to determine to promote the new content item in the list of search results cause the one or more processors to:
determine that the new content item is to be promoted when the sixth score satisfies a threshold.

20. The non-transitory computer-readable medium of claim 18, where one or more instructions, of the plurality of instructions, to determine to promote the new content item in the list of search results cause the one or more processors to:
determine that the particular term is associated with the new content item, and
determine that the new content item is to be promoted based on the particular term being associated with the new content item.

21. The non-transitory computer-readable medium of claim 18, where one or more instructions, of the plurality of instructions, to modify the list of search results to promote the new content item cause the one or more processors to:
place information regarding the new content item towards a top of the list of search results.

22. The non-transitory computer-readable medium of claim 18, where the plurality of instructions further causes the one or more processors to:
monitor the new content item, after promoting the new content item, to determine whether the new content item gains popularity; and
penalize the new content item or the particular channel based on determining that the new content item fails to gain popularity.

* * * * *